(12) United States Patent
Fischer et al.

(10) Patent No.: US 9,892,628 B2
(45) Date of Patent: Feb. 13, 2018

(54) METHOD OF CONTROLLING AN ELECTRONIC DEVICE

(71) Applicant: Logitech Europe S.A, Lausanne (CH)

(72) Inventors: Ariel Fischer, San Francisco, CA (US); Kuo-Yu (Gloria) Kao, Hsinchu (TW); Jose Froilan P. Lomotan, San Jose, CA (US); Nicolas Sasselli, Belmont-sur-Lausanne (CH); Nicolas Chauvin, Chexbres (CH); Frederic Frappereau, Menlo Park, CA (US); Derek Tarnow, Mountain View, CA (US); Bruce Lancaster, Palo Alto, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 21 days.

(21) Appl. No.: 14/749,537

(22) Filed: Jun. 24, 2015

(65) Prior Publication Data

US 2016/0105904 A1   Apr. 14, 2016

Related U.S. Application Data

(60) Provisional application No. 62/063,859, filed on Oct. 14, 2014.

(51) Int. Cl.
*H04B 7/24* (2006.01)
*G08C 17/02* (2006.01)
(Continued)

(52) U.S. Cl.
CPC ............ *G08C 17/02* (2013.01); *H04M 1/04* (2013.01); *H04M 1/7253* (2013.01); *H04W 4/00* (2013.01);
(Continued)

(58) Field of Classification Search
CPC  G08C 17/02; G08C 2201/30; G08C 2201/93; H04M 1/04; H04M 1/7253;
(Continued)

(56) References Cited

U.S. PATENT DOCUMENTS

| 602,616 A | 4/1898 | Cunningham |
| 614,759 A | 11/1898 | Richmond |

(Continued)

FOREIGN PATENT DOCUMENTS

| CA | 2286871 A1 | 11/2000 |
| CA | 2855788 A1 | 2/2009 |

(Continued)

OTHER PUBLICATIONS

Office Action dated Apr. 22, 2016 for U.S. Appl. No. 14/749,480.

(Continued)

*Primary Examiner* — Eugene Yun

(74) *Attorney, Agent, or Firm* — Patterson & Sheridan, LLP

(57) ABSTRACT

Embodiments disclosed herein generally include a system and a method of controlling a portable electronic device based on the interaction of the portable electronic device with an electronic device, such as a mounting device. Embodiments of the disclosure may include a system and a method of providing information to the portable electronic device that causes the portable electronic device to perform one or more desirable functions or processes based on the portable electronic device's interaction with the mounting device. In some embodiments, the portable electronic device may respond differently when it is caused to interact with differently configured mounting devices. Some aspects of the invention may include an apparatus, method and/or computing device software application that are configured to more easily setup and reliably control a portable electronic (Continued)

device based on the interaction of the portable electronic device with the mounting device.

19 Claims, 17 Drawing Sheets

(51) Int. Cl.
| | | |
|---|---|---|
| H04W 72/12 | (2009.01) | |
| H04W 76/02 | (2009.01) | |
| H04W 4/00 | (2009.01) | |
| H04M 1/04 | (2006.01) | |
| H04M 1/725 | (2006.01) | |

(52) U.S. Cl.
CPC ..... *H04W 72/1263* (2013.01); *H04W 76/023* (2013.01); *G08C 2201/30* (2013.01); *G08C 2201/93* (2013.01); *H04M 1/72569* (2013.01)

(58) Field of Classification Search
CPC ............... H04M 1/75269; H04W 4/00; H04W 72/1263; H04W 76/023
USPC .......................................................... 455/39
See application file for complete search history.

(56) References Cited

U.S. PATENT DOCUMENTS

| | | | |
|---|---|---|---|
| 6,215,980 B1* | 4/2001 | Kim | H04W 52/0216 340/7.34 |
| 6,240,297 B1 | 5/2001 | Jadoul | |
| 6,278,402 B1 | 8/2001 | Pippin | |
| 6,539,358 B1 | 3/2003 | Coon et al. | |
| 6,766,956 B1 | 7/2004 | Boylan, III et al. | |
| 6,993,615 B2 | 1/2006 | Falcon | |
| 7,020,499 B2 | 3/2006 | Moth et al. | |
| 7,031,698 B1 | 4/2006 | Appelman | |
| 7,085,551 B1 | 8/2006 | Bonner et al. | |
| 7,110,789 B1 | 9/2006 | Curtiss et al. | |
| 7,317,448 B1 | 1/2008 | Sasselli et al. | |
| 7,885,645 B2 | 2/2011 | Postma et al. | |
| 7,974,702 B1 | 7/2011 | Fain et al. | |
| 8,000,820 B2 | 8/2011 | Griffin, Jr. | |
| 8,010,728 B1 | 8/2011 | Grady et al. | |
| 8,117,370 B2 | 2/2012 | Rofougaran et al. | |
| 8,145,821 B2 | 3/2012 | Mead et al. | |
| 8,250,278 B2 | 8/2012 | Tseng et al. | |
| 8,355,673 B2 | 1/2013 | Kennedy | |
| 8,613,385 B1 | 12/2013 | Hulet et al. | |
| 8,749,360 B2 | 6/2014 | Chraime et al. | |
| 2001/0045774 A1 | 11/2001 | Rode | |
| 2002/0025832 A1 | 2/2002 | Durian et al. | |
| 2002/0123371 A1* | 9/2002 | Miyoshi | H04B 7/0615 455/562.1 |
| 2002/0128036 A1 | 9/2002 | Yach et al. | |
| 2003/0172217 A1 | 9/2003 | Scott et al. | |
| 2004/0097272 A1 | 5/2004 | Schuffert | |
| 2004/0098571 A1 | 5/2004 | Falcon | |
| 2004/0102227 A1 | 5/2004 | Schlegel | |
| 2004/0112958 A1 | 6/2004 | Rosica | |
| 2004/0121819 A1 | 6/2004 | Vogel | |
| 2004/0204074 A1 | 10/2004 | Desai | |
| 2004/0204192 A1 | 10/2004 | Holloway et al. | |
| 2004/0224638 A1 | 11/2004 | Fadell et al. | |
| 2005/0017946 A1 | 1/2005 | Park | |
| 2005/0020319 A1 | 1/2005 | Kim et al. | |
| 2005/0047071 A1 | 3/2005 | Tse Chun Hin | |
| 2005/0086410 A1 | 4/2005 | Landron et al. | |
| 2005/0143016 A1 | 6/2005 | Becker et al. | |
| 2005/0181828 A1 | 8/2005 | Silfverberg | |
| 2006/0012488 A1 | 1/2006 | Hilbrink et al. | |
| 2006/0026326 A1 | 2/2006 | Hunt et al. | |
| 2006/0030341 A1 | 2/2006 | Pham | |
| 2006/0066438 A1 | 3/2006 | Altounian et al. | |
| 2006/0178149 A1 | 8/2006 | Kamat et al. | |
| 2006/0212637 A1 | 9/2006 | Lo et al. | |
| 2006/0224305 A1 | 10/2006 | Ansari et al. | |
| 2006/0262103 A1 | 11/2006 | Hu et al. | |
| 2006/0285710 A1 | 12/2006 | DeVesto | |
| 2007/0026799 A1 | 2/2007 | Wang et al. | |
| 2007/0038434 A1 | 2/2007 | Cvetko | |
| 2007/0135135 A1 | 6/2007 | Brown | |
| 2007/0174531 A1 | 7/2007 | Liberty | |
| 2007/0207842 A1 | 9/2007 | Pemble et al. | |
| 2007/0242424 A1 | 10/2007 | Lieu et al. | |
| 2007/0263348 A1 | 11/2007 | Rutledge et al. | |
| 2008/0077882 A1 | 3/2008 | Kramer et al. | |
| 2008/0085689 A1 | 4/2008 | Lellner | |
| 2008/0200209 A1 | 8/2008 | Cahoon | |
| 2008/0253079 A1 | 10/2008 | Robinson et al. | |
| 2008/0263146 A1 | 10/2008 | Habuto et al. | |
| 2008/0269927 A1 | 10/2008 | Szolyga et al. | |
| 2008/0278894 A1 | 11/2008 | Chen et al. | |
| 2008/0309508 A1 | 12/2008 | Harmon | |
| 2009/0003620 A1 | 1/2009 | McKillop et al. | |
| 2009/0037634 A1 | 2/2009 | Kuris et al. | |
| 2009/0049554 A1 | 2/2009 | Vuong et al. | |
| 2009/0061841 A1 | 3/2009 | Chaudhri et al. | |
| 2009/0063744 A1 | 3/2009 | Krueger et al. | |
| 2009/0143114 A1 | 6/2009 | Vargas et al. | |
| 2009/0181645 A1 | 7/2009 | Chan et al. | |
| 2009/0198852 A1 | 8/2009 | Rofougaran et al. | |
| 2009/0198854 A1 | 8/2009 | Rofougaran et al. | |
| 2009/0199219 A1 | 8/2009 | Rofougaran et al. | |
| 2009/0201152 A1 | 8/2009 | Karr et al. | |
| 2009/0327560 A1 | 12/2009 | Yalovsky | |
| 2010/0064883 A1 | 3/2010 | Gynes | |
| 2010/0081473 A1 | 4/2010 | Chatterjee et al. | |
| 2010/0081505 A1 | 4/2010 | Alten et al. | |
| 2010/0095041 A1 | 4/2010 | Bailey | |
| 2010/0137028 A1 | 6/2010 | Farris et al. | |
| 2010/0138581 A1 | 6/2010 | Bird et al. | |
| 2010/0149030 A1 | 6/2010 | Verma et al. | |
| 2010/0157061 A1 | 6/2010 | Katsman et al. | |
| 2010/0161090 A1 | 6/2010 | Smolinski et al. | |
| 2010/0161689 A1 | 6/2010 | Dong et al. | |
| 2010/0174390 A1 | 7/2010 | Garrett et al. | |
| 2010/0198428 A1 | 8/2010 | Sultan et al. | |
| 2010/0217835 A1 | 8/2010 | Rofougaran et al. | |
| 2010/0217836 A1 | 8/2010 | Rofougaran | |
| 2010/0217912 A1 | 8/2010 | Rofougaran et al. | |
| 2010/0250789 A1 | 9/2010 | Collopy et al. | |
| 2010/0250816 A1 | 9/2010 | Collopy et al. | |
| 2010/0250817 A1 | 9/2010 | Collopy et al. | |
| 2010/0250818 A1 | 9/2010 | Gill et al. | |
| 2010/0250975 A1 | 9/2010 | Gill et al. | |
| 2010/0251243 A1 | 9/2010 | Gill et al. | |
| 2010/0251361 A1 | 9/2010 | Collopy et al. | |
| 2010/0305749 A1 | 12/2010 | Coe | |
| 2011/0022350 A1 | 1/2011 | Chatterjee | |
| 2011/0029385 A1 | 2/2011 | Engel et al. | |
| 2011/0053549 A1 | 3/2011 | Lai | |
| 2011/0053643 A1 | 3/2011 | Shmunis | |
| 2011/0071658 A1 | 3/2011 | Krampf et al. | |
| 2011/0099316 A1 | 4/2011 | Tseng et al. | |
| 2011/0119080 A1 | 5/2011 | Hayter et al. | |
| 2011/0124371 A1 | 5/2011 | Li et al. | |
| 2011/0145466 A1 | 6/2011 | Supran et al. | |
| 2011/0162035 A1 | 6/2011 | King et al. | |
| 2011/0183725 A1 | 7/2011 | Cohen et al. | |
| 2011/0217919 A1 | 9/2011 | Arend et al. | |
| 2011/0230209 A1 | 9/2011 | Kilian | |
| 2011/0264835 A1 | 10/2011 | Chen et al. | |
| 2011/0291927 A1 | 12/2011 | Slaby et al. | |
| 2011/0298736 A1 | 12/2011 | Madonna et al. | |
| 2012/0005691 A1 | 1/2012 | Wong et al. | |
| 2012/0016758 A1 | 1/2012 | Bouaziz et al. | |
| 2012/0035924 A1 | 2/2012 | Jitkoff et al. | |
| 2012/0054401 A1 | 3/2012 | Cheng | |
| 2012/0070017 A1 | 3/2012 | Dorogusker et al. | |
| 2012/0072044 A1 | 3/2012 | Slaby et al. | |
| 2012/0088493 A1 | 4/2012 | Chen et al. | |
| 2012/0108335 A1 | 5/2012 | Liotta et al. | |
| 2012/0113002 A1 | 5/2012 | Plestid | |

(56) References Cited

U.S. PATENT DOCUMENTS

| | | |
|---|---|---|
| 2012/0144083 A1 | 6/2012 | Hassan et al. |
| 2012/0155325 A1 | 6/2012 | Eichen et al. |
| 2012/0159144 A1 | 6/2012 | Sengupta et al. |
| 2012/0169487 A1 | 7/2012 | Poder |
| 2012/0172012 A1 | 7/2012 | Sumcad et al. |
| 2012/0177231 A1 | 7/2012 | Yang |
| 2012/0180086 A1 | 7/2012 | Yang |
| 2012/0190406 A1 | 7/2012 | Chen |
| 2012/0191449 A1 | 7/2012 | Lloyd et al. |
| 2012/0233369 A1 | 9/2012 | Kung |
| 2012/0249463 A1 | 10/2012 | Leung et al. |
| 2012/0258668 A1 | 10/2012 | Rokusek et al. |
| 2012/0282908 A1 | 11/2012 | Nicolini |
| 2012/0302288 A1 | 11/2012 | Born et al. |
| 2012/0303476 A1 | 11/2012 | Krzyzanowski et al. |
| 2012/0324135 A1 | 12/2012 | Goodman et al. |
| 2012/0324540 A1 | 12/2012 | Wu |
| 2013/0005401 A1 | 1/2013 | Rosenhan et al. |
| 2013/0006526 A1 | 1/2013 | Banus |
| 2013/0014232 A1 | 1/2013 | Louboutin et al. |
| 2013/0028144 A1 | 1/2013 | Goodman et al. |
| 2013/0053099 A1 | 2/2013 | Nabata et al. |
| 2013/0054952 A1 | 2/2013 | Shen |
| 2013/0102282 A1 | 4/2013 | Cutts et al. |
| 2013/0103873 A1 | 4/2013 | Reilly et al. |
| 2013/0124762 A1 | 5/2013 | Tamir et al. |
| 2013/0130669 A1 | 5/2013 | Xiao et al. |
| 2013/0151111 A1 | 6/2013 | Skelton |
| 2013/0157607 A1 | 6/2013 | Paek et al. |
| 2013/0157647 A1 | 6/2013 | Kolodziej |
| 2013/0162515 A1 | 6/2013 | Prociw et al. |
| 2013/0219098 A1 | 8/2013 | Turnpenny et al. |
| 2013/0225086 A1 | 8/2013 | Hsu et al. |
| 2013/0225233 A1 | 8/2013 | Elter et al. |
| 2013/0273970 A1 | 10/2013 | Selim |
| 2013/0275643 A1 | 10/2013 | Teltz |
| 2013/0293731 A1 | 11/2013 | Kim |
| 2013/0297844 A1 | 11/2013 | Rosenberg et al. |
| 2013/0304959 A1 | 11/2013 | Chiang |
| 2013/0307665 A1 | 11/2013 | Wang et al. |
| 2013/0325479 A1 | 12/2013 | Krueger et al. |
| 2013/0343247 A1 | 12/2013 | Kasher |
| 2014/0013014 A1 | 1/2014 | Huang et al. |
| 2014/0018128 A1 | 1/2014 | Martin et al. |
| 2014/0036767 A1 | 2/2014 | Perugupalli et al. |
| 2014/0043135 A1 | 2/2014 | Kotecha et al. |
| 2014/0059264 A1 | 2/2014 | Sudak |
| 2014/0075075 A1 | 3/2014 | Morrill et al. |
| 2014/0107864 A1 | 4/2014 | Cecchini |
| 2014/0148193 A1 | 5/2014 | Kogan et al. |
| 2014/0162681 A1 | 6/2014 | Noonan et al. |
| 2014/0172128 A1 | 6/2014 | Johnson et al. |
| 2014/0173155 A1 | 6/2014 | Slattery |
| 2014/0184508 A1 | 7/2014 | Tamasi et al. |
| 2014/0194084 A1 | 7/2014 | Noonan et al. |
| 2014/0206436 A1 | 7/2014 | French |
| 2014/0248863 A1 | 9/2014 | Golsch |
| 2014/0269222 A1 | 9/2014 | Patton et al. |
| 2014/0274200 A1 | 9/2014 | Olson |
| 2014/0277642 A1 | 9/2014 | Anderson et al. |
| 2014/0280552 A1 | 9/2014 | Ng et al. |
| 2014/0342775 A1 | 11/2014 | Kemmler et al. |
| 2014/0344495 A1 | 11/2014 | Zeung et al. |
| 2015/0081188 A1 | 3/2015 | Komhaas |
| 2015/0295661 A1 | 10/2015 | Huang |
| 2015/0301615 A1 | 10/2015 | Kasar et al. |
| 2016/0066122 A1 | 3/2016 | Kao et al. |

FOREIGN PATENT DOCUMENTS

| | | |
|---|---|---|
| CA | 2779136 A1 | 12/2012 |
| CA | 2798684 A1 | 6/2013 |
| EP | 1096761 A2 | 5/2001 |
| EP | 1385325 A1 | 1/2004 |
| EP | 1665845 A1 | 6/2006 |
| EP | 1833232 A2 | 9/2007 |
| EP | 2268052 A1 | 12/2010 |
| EP | 2418461 A1 | 2/2012 |
| EP | 2464143 A1 | 6/2012 |
| EP | 2645343 A2 | 10/2013 |
| EP | 2712221 A1 | 3/2014 |
| EP | 2720113 A2 | 4/2014 |
| EP | 2741290 A1 | 6/2014 |
| EP | 2757538 A1 | 7/2014 |
| EP | 2778829 A2 | 9/2014 |
| EP | 2793491 A1 | 10/2014 |
| GB | 2343338 A | 5/2000 |
| GB | 2369224 A | 5/2002 |
| GB | 2470110 A | 11/2010 |
| GB | 2479996 A | 11/2011 |
| GB | 2486384 A | 6/2012 |
| GB | 2505867 A | 3/2014 |
| GB | 2510436 A | 8/2014 |
| KR | 20050012965 A | 2/2005 |
| KR | 20070017860 A | 2/2007 |
| KR | 20120106480 A | 9/2012 |
| KR | 20130071146 A | 6/2013 |
| KR | 101390352 B1 | 4/2014 |
| TW | 200921412 A | 5/2009 |
| WO | 1998019435 A2 | 5/1998 |
| WO | 1998023041 A1 | 5/1998 |
| WO | 2004077829 A1 | 9/2004 |
| WO | 2005001739 A2 | 1/2005 |
| WO | 2005024818 A1 | 3/2005 |
| WO | 2006085702 A1 | 8/2006 |
| WO | 2007019510 A2 | 2/2007 |
| WO | 2007070543 A2 | 6/2007 |
| WO | 2007101712 A2 | 9/2007 |
| WO | 2009024749 A1 | 2/2009 |
| WO | 2009088373 A1 | 7/2009 |
| WO | 2010051455 A2 | 5/2010 |
| WO | 2010069048 A1 | 6/2010 |
| WO | 2011007332 A1 | 1/2011 |
| WO | 2011094703 A1 | 8/2011 |
| WO | 2012010210 A1 | 1/2012 |
| WO | 2013006973 A1 | 1/2013 |
| WO | 2013030736 A1 | 3/2013 |
| WO | 2013076611 A1 | 5/2013 |
| WO | 2013076625 A1 | 5/2013 |
| WO | 2013132515 A2 | 9/2013 |
| WO | 2013156613 A1 | 10/2013 |
| WO | 2013185176 A1 | 12/2013 |
| WO | 2014097055 A1 | 6/2014 |
| WO | 2014145990 A1 | 9/2014 |
| WO | 2014151397 A1 | 9/2014 |

OTHER PUBLICATIONS

Office Action dated Mar. 10, 2016 for U.S. Appl. No. 14/659,903.
Office Action dated Mar. 11, 2016 for U.S. Appl. No. 14/660,308.
Office Action dated Jul. 14, 2016 for U.S. Appl. No. 15/065,680.

\* cited by examiner

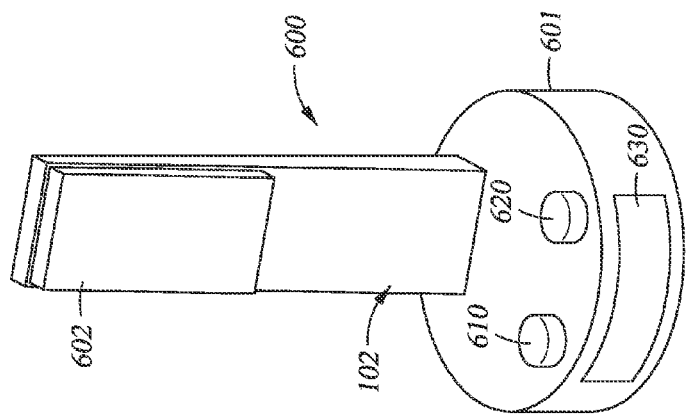
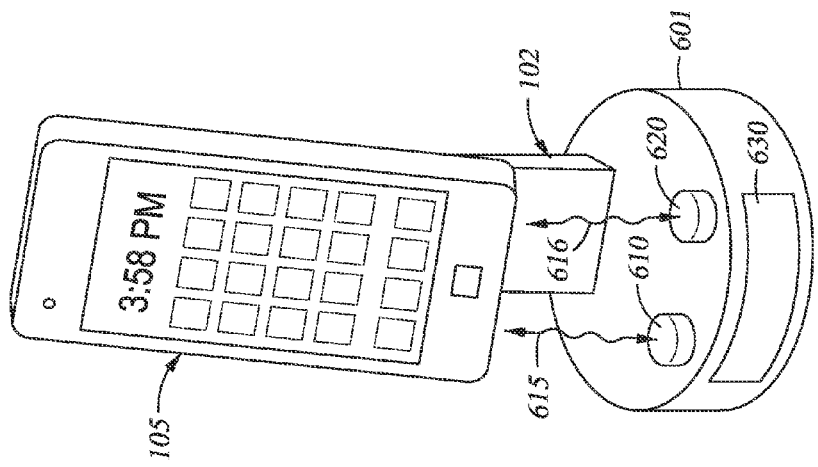

METHOD OF CONTROLLING AN ELECTRONIC DEVICE

CROSS-REFERENCE TO RELATED APPLICATIONS

This application claims the benefit of U.S. provisional patent application Ser. No. 62/063,859, filed Oct. 14, 2014, which is hereby incorporated herein by reference.

BACKGROUND OF THE INVENTION

1. Field of the Invention

Embodiments disclosed herein generally relate to methods and electronic devices used to enable the configuration and control of one or more portable electronic devices.

2. Description of the Related Art

The popularity of portable electronics, such as smart phones, touch pads, PDAs, portable computers and portable music players, has increased dramatically in the past decade. As people have become more reliant on portable electronics they have found more and more uses in the home, business and automobiles, such as GPS applications, audio playback applications, texting applications, camera applications, baby monitors and many other useful applications.

As the development of software applications that run on today's portable electronic devices have improved, the usefulness and our reliance on these types of portable electronic devices, such as smart phones, tablets and other similar devices have increased. One use of a portable electronic device that has developed in recent years, is the use of the portable electronic device in an automobile to help the driver stay connected to the outside world and/or help them get from one place to another. These devices have greatly increased the ability for individuals to move from location to location while still being able to conduct business or tend to personal matters. However, the use of portable electronic devices in an automobile or other similar applications have both safety and usability limitations. Instead of using a mobile telephone only in emergency situations, many individuals use their telephones while driving an automobile. To do so, these drivers will sometimes take their eyes off of the road or waterway to look at their telephone to dial the desired number or interact with phone in some way. As such, the driver is less likely to be able to react quickly to an emergency situation while driving and is a much greater risk to the surrounding drivers since their attention is diverted from the road while dialing and/or talking on the telephone.

In the automobile application, various systems have attempted to reduce the need for a driver to remove the driver's hand to use a mobile telephone and/or to reduce the amount of time a driver's eyes are not on the road ahead. Some automobile manufacturers have attempted to provide solutions by providing a system that is able to communicate with the user's phone, such as a Bluetooth communication device that is integrated within the audio system of the automobile. These automobile systems only contain a simple communication interface that is not able to recognize and provide content based on the user's portable electronic device. Also, with the proliferation of the use portable electronic devices it is often hard for the automobile's system to distinguish between multiple wireless communication enabled devices that are positioned within the local environment. The confusion created by the presence of multiple wireless communication devices in an automobile, residential or business environment can cause or require the user to be distracted from his/her current activities due to the need to interact with the portable electronic device to define which device is to be used. The distraction from the user's current activities can lead to safety concerns as well as simply be inconvenient for the user.

Therefore, there is need for an electronic device that is able interface with the portable electronic device so that it will automatically and seamlessly provide desirable information to the user and to avoid the above-mentioned problems. There is also a need for a software application and a control method that allows the above described portable electronic device to be easily controlled due to the simple interaction of the portable electronic device with a device controlling system.

SUMMARY OF THE INVENTION

Embodiments disclosed herein generally include a system and a method of controlling a portable device based on the interaction of the portable device with an electronic device, such as a mounting device. In some embodiments, the interaction of the portable device with the electronic device causes the portable device to perform one or more desirable functions or processes. The one or more desirable functions or processes will generally include the portable device performing a desirable primary control function. The portable device's primary control function is typically performed by software applications running on the portable device, and may include causing the portable device to operate in a certain desired way and/or to perform one or more desired activities, while the portable device is engaged with the electronic device. For example, the one or more desired activities may include controlling the information transferred between the user and other programs running on the portable device and/or causing the portable device to operate in a hands-free type safe mode of operation.

Embodiments disclosed herein may further provide an electronic device, comprising an enclosure having a supporting surface, a processor, a memory having stored therein mode of operation information, a sensor that is configured to detect the presence of a first portable device that is positioned proximate to the supporting surface, and a wireless transceiver that is in communication with the processor. The wireless transceiver being configured to wirelessly transfer the mode of operation information to the first portable device. The memory of the electronic device may also include a number of instructions, which when executed by the processor, causes the electronic device to perform operations comprising receiving a first signal from the first portable device, receiving a second signal from a second electronic device, measuring a signal strength of the first signal and the second signal, and comparing the measured signal strengths.

Embodiments disclosed herein may further provide a method of controlling a portable electronic device, comprising sensing that a first portable device is disposed proximate to an electronic device, wherein the electronic device comprises a wireless transceiver, receiving device information from the first portable device using the wireless transceiver, delivering a first signal to the first portable device, wherein the first signal comprises primary control function information, and delivering an output to a user from the first portable device, wherein the output is derived from at least a portion of the delivered first signal.

Embodiments disclosed herein may further provide a method of controlling a portable electronic device, comprising sensing that a first portable device is in contact with an electronic device, wherein the electronic device comprises a wireless transceiver, delivering a first signal from the electronic device to the first portable device, receiving device information from the first portable device, wherein the device information comprises information relating to an attribute of the first portable device, delivering a second signal from the electronic device to the first portable device, wherein the second signal comprises primary control function information, and delivering an output to a user from the first portable device, wherein the output is derived from at least a portion of the delivered second signal.

Embodiments disclosed herein may further provide an electronic device, comprising a processor, and a non-transitory memory having stored therein a number of instructions which, when executed by the processor, causes the electronic device to perform operations comprising receiving a first input from a user at a first time, receiving information from a second electronic device, wherein the received information is received at a second time, and controlling the delivery of information to the user from the electronic device, wherein controlling the delivery of information comprises transmitting the information received from the second electronic device to the user when the magnitude of the difference between the second time and the first time is less than or equal to an input time window value that is stored in the non-transitory memory of the electronic device, and storing the information received from the second electronic device in the non-transitory memory when the magnitude of the difference between the second time and the first time is greater than the input time window value.

Embodiments disclosed herein may further provide a method of controlling an electronic device, comprising receiving, at a first electronic device, a first input from a user at a first time, receiving, at the first electronic device, information from a second electronic device, wherein the received information is received at a second time, and controlling the delivery of information to the user from the first electronic device, wherein controlling the delivery of information comprises transmitting the information received from the second electronic device to the user when the magnitude of the difference between the second time and the first time is less than or equal to an input time window value that is stored in a memory location of the first electronic device, and storing the information received from the second electronic device in a memory location when the magnitude of the difference between the second time and the first time is greater than the input time window value.

Embodiments disclosed herein may further provide a method of controlling an electronic device, comprising receiving, at a first electronic device, a first input from a user at a first time, initiating a messaging timer due to the receipt of the first input, receiving, at the first electronic device, information from a second electronic device, wherein the received information is received after the messaging timer has exceeded an input time window, initiating a hold timer based on the receipt of the information from the second electronic device, and delivering the information received from the second electronic device to the user after it is determined that the hold timer has reached a desired hold time.

Embodiments disclosed herein may further provide a method of controlling an electronic device, comprising receiving, at a first electronic device, input information, analyzing the input information to determine if the received input information comprises application data, retrieving application information from a memory of the first electronic device, wherein the retrieved application information is selected based on the received application data, transmitting the received input information to a user or a second electronic device, and transmitting information derived from at least a portion of the retrieved application information to the user or the second electronic device.

Embodiments disclosed herein may further provide a method of controlling an electronic device, comprising receiving, at a first electronic device, input information, analyzing the input information to determine if the received input information comprises application data, transmitting an input disposition request to a user, wherein the input disposition request is derived from the determined application data, receiving an input disposition request instruction, wherein the input disposition request instruction is derived from the input disposition request, and transmitting the received input information to the user after receiving the input disposition request instruction.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6A illustrates an electronic device positioned on a mounting device on a docking station, according to one embodiment of the present disclosure.

FIG. 6B is an isometric view of a docking station, according to one embodiment of the present disclosure.

Figure 1:
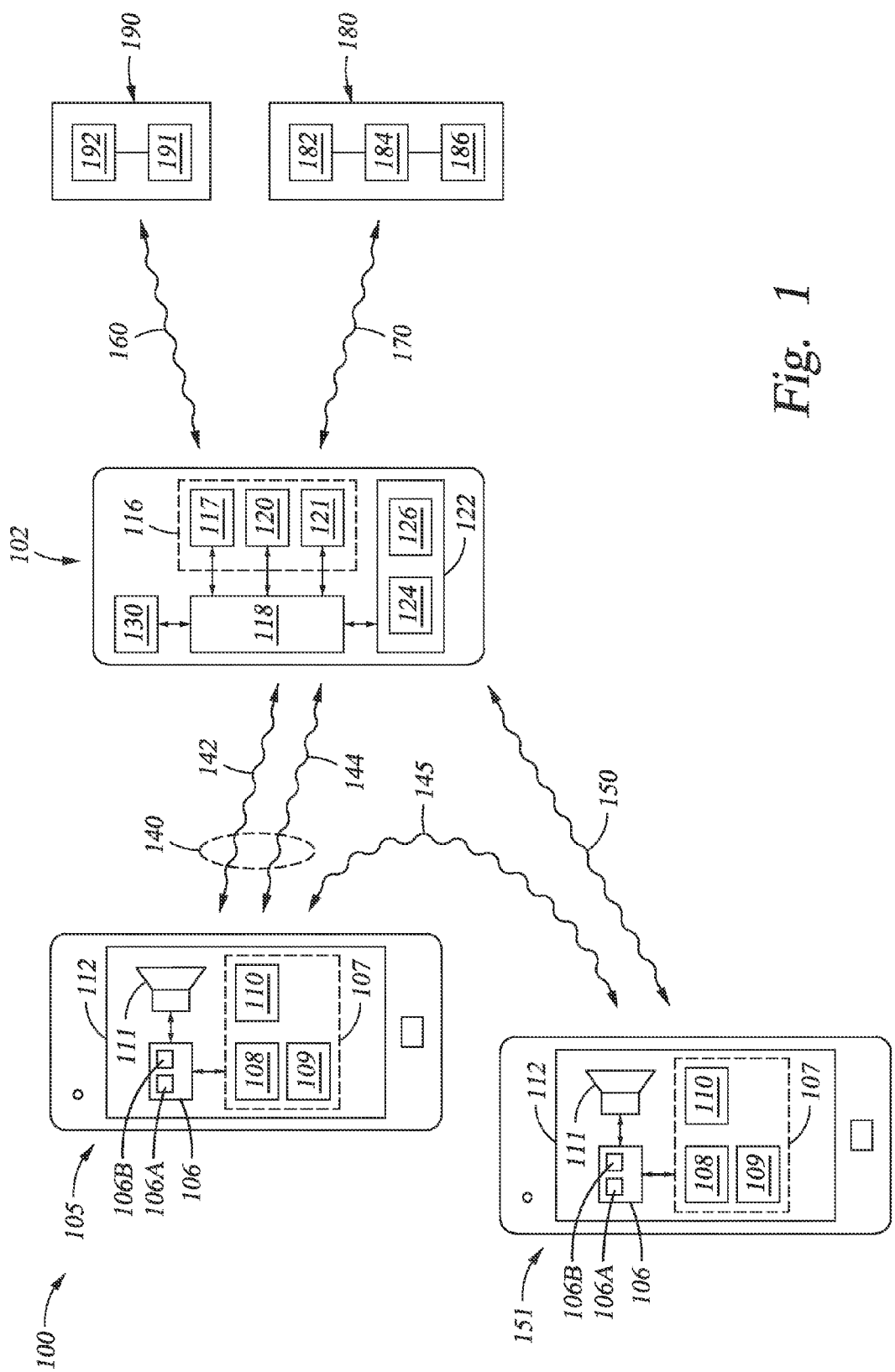
FIG. 1 illustrates one or more electronic devices and a mounting device that are interconnected using various communication links, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Embodiments disclosed herein generally include a system and a method of controlling a portable electronic device, hereafter portable device, based on the interaction of the portable device with an electronic device, such as a mounting device. Embodiments of the disclosure may include a system and a method of providing information to the portable device, which causes the portable device to perform one or more desirable functions or processes based on the portable device's interaction with the mounting device. In some embodiments, the portable device may respond differently when it is caused to interact with differently configured mounting devices. Some aspects of the invention may include an apparatus, method and/or computing device software application(s) that are configured to more easily setup and reliably control a portable device based on the interaction of the portable device with the mounting device.

In some embodiments, the apparatus and methods include a mounting device that can provide information about the environment that the portable device has been placed in or the type of task that is desired to be performed by the portable device based on interaction of the portable device with a mounting device. In one example, a first mounting device is configured to be positioned in an automobile, and thus is adapted to cause the software application(s) running on the portable device to perform automobile related applications, such as, for example, navigation programs, hand-free texting applications, or audio applications, based on the interaction with the first mounting device. While, in this example, if the same portable device is caused to interact with a second mounting device that is configured differently from the first mounting device the portable device may then perform a different type process based on the interaction with the second mounting device. For example, if the second mounting device is configured to cause the portable device to perform a baby monitor type application, the software application(s) running on the portable device are altered or adjusted so that a baby monitor processes and/or an audio delivery application can be performed, based on the interaction with the second mounting device.

FIG. 1 is a schematic diagram that illustrates a mounting device 100 that comprises at least one mounting assembly 102 that is configured to interact with an electronic device, such as a primary portable device 105. In general, the mounting assembly 102 is an auxiliary computing device, or electronic device, that is used in conjunction with the primary portable device 105. In general, the mounting assembly 102 and the primary portable device 105 are able to communicate with each other over a communication link 140.

In some embodiments, during operation, when the primary portable device 105 is caused to interact with the mounting assembly 102, a wireless communication signal is generated by the mounting assembly 102. The generated wireless communication signal is then received via the communication link 140 and is processed by the primary portable device 105. The processed wireless communication signal is then used by the primary portable device to cause one or more activities to be performed by one or more software applications running within the primary portable device 105 based on the information received in the wireless communication signal. The information provided by the mounting assembly 102 may contain preset configuration or desired mode of operation related information stored within the mounting assembly 102 that are transferred during the delivery of the wireless communication signal. Thus, in some embodiments, the primary portable device 105 need not contain hardware that is specially configured to interact with the mounting device, but only requires that the primary portable device 105 be enabled to communicate with the mounting assembly 102 and have one or more preloaded software applications running on primary portable device 105 that are adapted to perform the one or more desired activities based on the information received in wireless communication signal.

The mounting assembly 102 may be any technically feasible electronic device configured to interact with a primary portable device 105. In practice, mounting assembly 102 may be battery-operated, although a mounting device that receive power from a wall outlet, wireless charger, automobile charger or other similar devices also fall within the scope of the present invention. In general, the mounting assembly 102 may comprise a device that has the capability of storing, processing and delivering information to the primary portable device 105 so that the primary portable device 105 can perform some useful function and/or interact with a user.

The mounting assembly 102 may comprise a processor 118 coupled to input/output (I/O) devices 116, a power source 130 and a memory unit 122. Memory unit 122 may include one or more software applications 124 and stored media data 126. Processor 118 may be a hardware unit or combination of hardware units capable of executing software applications and processing data. In some configurations, the processor 118 includes a central processing unit (CPU), a digital signal processor (DSP), an application-specific integrated circuit (ASIC), and/or a combination of such units. Processor 118 is generally configured to execute the one or more software applications 124 and process the stored media data 126, which are each included within memory unit 122.

The I/O devices 116 are coupled to memory unit 122 and processor 118, and may include devices capable of receiving input and/or devices capable of providing output. For example, I/O devices 116 could include one or more sensors 117 that are configured to sense the interaction of the primary portable device 105 with the mounting assembly 102, and also provide information to the processor 118. The I/O devices 116 also include one or more wireless transceivers 120 that are configured to establish one or more different types of wired or wireless communication links with other transceivers residing within other computing devices, such as a transceiver within the processing system 106 of the primary portable device 105. A given transceiver within I/O devices 116 could establish, for example, a Wi-Fi communication link, near field communication (NFC) link or a Bluetooth® communication link (e.g., BTLE, Bluetooth classic), among other types of communication links with similar components in the primary portable device 105.

In some embodiments, the I/O devices 116 may include a wireless signal strength comparison device 121 that is adapted to detect the signal strength of one or more wireless signals that are received by a wireless transceiver 120 in the mounting assembly 102. The signal comparison device may also include one or more analog or digital comparison circuits (e.g., OP Amps), and at least one feedback circuit that is able to provide the processor 118 with information about the wireless signals received by the mounting assembly 102. In one example, the wireless signal strength comparison device is able to determine the relative power levels of two or more wireless signals that have been received from two or more portable electronic devices, such as the primary portable device 105 and the second electronic device 151 during operation. Various applications and uses of the wireless signal strength comparison device 121 are further discussed below.

Memory unit 122 may be any technically feasible type of hardware unit configured to store data. For example, memory unit 122 could be a hard disk, a random access memory (RAM) module, a flash memory unit, or a combination of different hardware units configured to store data. Software application 124, which is stored within the memory unit 122, includes program code that may be executed by processor 118 in order to perform various functionalities associated with the mounting assembly 102.

The stored media data 126 may include any type of information that relates to a desired control parameter, user data, mounting device configuration data or other useful information. The stored media data 126 may include information that is delivered to and/or received from the primary portable device 105. The software application 124 may generate wireless control signals based on the stored media data 126. The stored media data 126 may reflect various data files, settings and/or parameters associated with the environment and/or desired behavior of the primary portable device 105. As mentioned above, software application 124 may configure the mounting assembly 102 based on stored media data 126.

The primary portable device 105, which are well known in the art, can be any type of portable electronic device, such as a cell phone (e.g., smart phone), a tablet computing device, laptop computer, an e-book reader, a portable music player, or other similar electronic device. Examples of a primary portable device 105 may include, but are not limited to an iPod®, iPhone®, iPad®, Android™ phone, Samsung phone, Samsung Galaxy®, Squeeze™ box, Microsoft Surface®, laptop or other similar device. The primary portable device 105 may comprise a processing system 106 and memory 107, which may contain stored data 108 and one or more software programs, such as programs 109 and 110. The processing system 106 will typically includes input/output (I/O) devices 106A, a processor 106B, which may include a central processing unit (CPU), a digital signal processor (DSP), and/or application-specific integrated circuits (ASIC), and other useful components. The I/O devices within the primary portable device 105 may include a speaker 111, display device 112, a touch sensing device (not shown) and/or one or more transceivers (not shown) configured to establish a wired or wireless communication link with other transceivers residing within other computing devices, such as the wireless transceiver 120. The I/O devices within the primary portable device 105 may also include motion sensing devices (e.g., accelerometers), magnetic field sensing devices, sound sensing devices or other useful sensors that can be used to sense the interaction of the primary portable device 105 and the mounting assembly 102. The I/O devices may also include one or more timing devices, such as a clock (not shown), that are configured to provide time related information to the processor within the processing system 106. The clock may be a simple IC or similar component, such as a crystal oscillator. The software applications, or programs 109 and 110, may include software applications that are configured to run in the foreground or background on the primary portable devices 105. The software applications are used to control one or more activities being performed by the primary portable device 105 and/or provide some useful input to the user via audio or visual means provided by the primary portable devices 105.

As noted above, with the proliferation of the use portable devices, the mounting device 100 may also separately receive information from a second electronic device 151 that is also positioned within communication range of the mounting assembly 102 via a communication link 150. Therefore, in some configurations the mounting assembly 102 may also be configured to communicate with a second electronic device 151. The second electronic device 151 may be similarly configured as the primary portable device 105, and thus will not be discussed further herein. However, often the presence of a second electronic device 151 near the mounting assembly 102 may be undesirable, since it can create confusion as to which of the devices are to be desirably controlled due to their interaction with the mounting device. Solutions to these types of problems are discussed further below.

Also, in some embodiments, to improve a user's audio experience, it is desirable for the mounting device 100 to be configured to communicate with one or more media output devices 180. While not intending to limit the scope of the disclosure described herein, in some configurations the media output device 180 is an Ultimate Ears Boom™ by Logitech Europe S.A. The media output device 180 may comprise a processor 184 that is coupled to input/output (I/O) devices 182 and a power source 186. The I/O devices 182 may include a wireless transceiver (not shown) and a speaker (not shown). In one example, the auxiliary media output device 180 is adapted to communicate with the mounting assembly 102 via a link 170 using the wireless transceiver. The links 170 may include wired or wireless links that allow the media output device 180 to communicate with the mounting assembly 102 and/or primary portable device 105. In some configurations, the memory unit 122 in the mounting assembly 102 may contain information regarding the media output device 180, such as EQ settings, pairing information or other useful information. The stored information can thus be retrieved and delivered to the media output device 180 and/or primary portable device 105 at a desirable time to facilitate the delivery of an audio output from the media output device 180 using audio data received from the primary portable device 105.

In some configurations, the mounting device 100 may also contain audio playback capabilities, a microphone, navigation related components (e.g., gyroscope components, GPS components), timing related components or other desirable and useful features.

Mounting Device System and Method Examples

Figure 2:
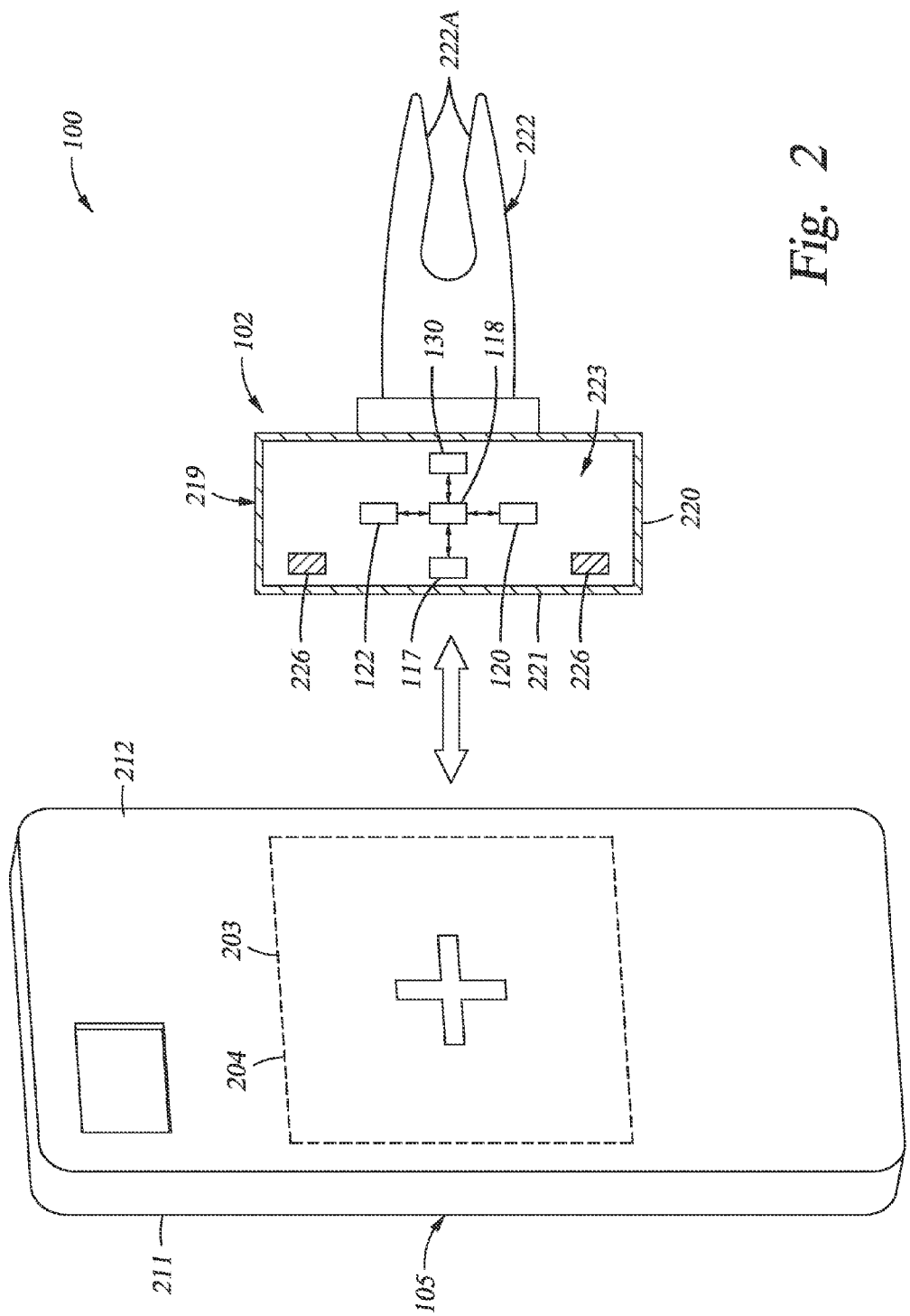
FIG. 2 illustrates an example of an electronic device and a mounting device, according to one embodiment of the present disclosure.

FIG. 2 is a schematic diagram of a mounting device 100 that comprises a mounting assembly 102 that includes an enclosure 220 that has a mounting feature 222 and a device mounting region 219. In one configuration, the enclosure 220 is formed from a plastic, metal or composite material, and is configured to house the supporting electronics (e.g., processor 118, sensor 117, wireless transceiver 120 a power source 130 and a memory unit 122) within an internal region 223.

The device mounting region 219 will generally include a mounting surface 221 that is configured to form a stable physical contact region that is used to support the primary portable device 105. The device mounting region 219 may also include a plurality of magnets 226 that are configured to attract elements in an opposing mounting region 203 formed in the primary portable device 105 to the mounting surface 221. In some embodiments, the primary portable device 105 includes a cover 201 that is configured to surround at least a portion of the primary portable device 105. The cover 201 may include the mounting region 203 that has a structural element 204 that is configured to guide or preferentially cause the surface 221 of the mounting assembly 102 to be attracted to the mounting region 203. In one example, the structural element 204 may comprise a magnetic material, wherein the magnetic material generally includes a material that is attracted to magnets 226 disposed on or within the mounting assembly 102. In one example, the magnetic material may comprise plain carbon steel, 300 series stainless steel or more generally a ferromagnetic material. In this case, when the mounting region 203 of the primary portable device 105 is positioned near the surface 221 of the mounting assembly 102, the surface of the mounting region 203 and the surface 221 are brought into contact with each other due to the magnetic attraction of the magnets 226 to the structural element 204. One will note that, in some embodiments, the structural element 204 need not be a part of the primary portable device 105 (e.g., smart phone), but is a component that can be easily and separately added to or attached to the primary portable device 105. In one configuration, the structural element 204 is directly coupled to a surface of the primary portable device 105 (e.g., bonded to a surface of the primary portable device 105). In another configuration, the structural element 204 is indirectly coupled to a surface of the primary portable device 105, such as, for example, being disposed between a plastic cover and a surface of the primary portable device 105 or attached to a cover that is attached to the primary portable device 105.

In one configuration, the sensor 117 is positioned to detect the presence of the primary portable device 105 through the mounting surface 221 of the enclosure 220. The sensor 117 may include a mechanical, electrical or electro-optical type device that is adapted to sense the presence of the primary portable device 105 and provide a presence detection signal to the processor 118. In one example, the sensor 117 is a reed switch, mechanical switch, mechanical contact type switch, an acoustic sensing sensor or capacitive sensing type sensor that can provide a desired signal to the processor 118. In one example, the sensor 117 is an accelerometer that provides a signal to the processor 118 that is generated from the interaction of the mounting assembly 102 and the primary portable device 105. In some embodiments, the sensor 117 is configured to draw little or no power from the power source 130 during operation and/or idle times, so that the useable lifetime of the power source 130 (e.g., batteries) can be maximized.

In one example, the sensor 117 and device mounting region 219 are configured to sense the deformation or alteration in the shape of the mounting surface 221 when the primary portable device 105 is placed in contact with mounting surface 221 of the enclosure 220. In another example, the mounting surface 221 may initially be dome shaped (e.g., extending further from the enclosure 220 in the center of the surface 221 versus the edge (e.g., convex shaped)), but become distorted in an inward direction when the mounting region 203 of the primary portable device 105 is brought into contact with the surface 221. The inward distortion may then cause a change in the electrical resistance of a portion of the sensor 117, which is used to detect the presence of the primary portable device 105 by use of the processor 118.

In some configurations, the sensor 117 may be part of a solar cell device (not shown) that is used to sense when the primary portable device 105 is in contact with the mounting assembly 102 by the obstruction of the light receiving surface of the solar cell by the position of the primary portable device 105 when it is in contact with the mounting assembly 102. The solar cell device may be part of the enclosure 220, or be a separate attached electrical component, that is also used to charge the batteries found within the power source 130.

The mounting feature 222 may include a clasping element 222A that is adapted to couple to structural features commonly found in an automobile, house or business location. In one example, the clasping element 222A is configured to be attached to a dashboard or console component found in an automobile. FIG. 5B, which is discussed further below, is a cross-sectional view of a clasping element 222A that is disposed on a louver 501 found in an air vent of an automobile. While the mounting assembly 102 is illustrated in FIG. 2 as containing a clasping type element, this configuration is not intended to be limiting as to the scope of the invention provided herein, since other types of mounting features can be used without deviating from the basic scope of the invention provided herein. Thus, the clasping element 222A may alternately comprise a suction cup or other similar mounting component that is able attach the mounting assembly 102 to one or more components within the automobile environment, such as a cup holder, window, dashboard and/or 12V power jack. In some configurations, the clasping element 222A is adapted to support the weight of the primary portable device 105 and the contents of the enclosure 220 when the primary portable device 105 is disposed on or coupled to the surface 221.

Processing Sequence Examples

Figure 3A:
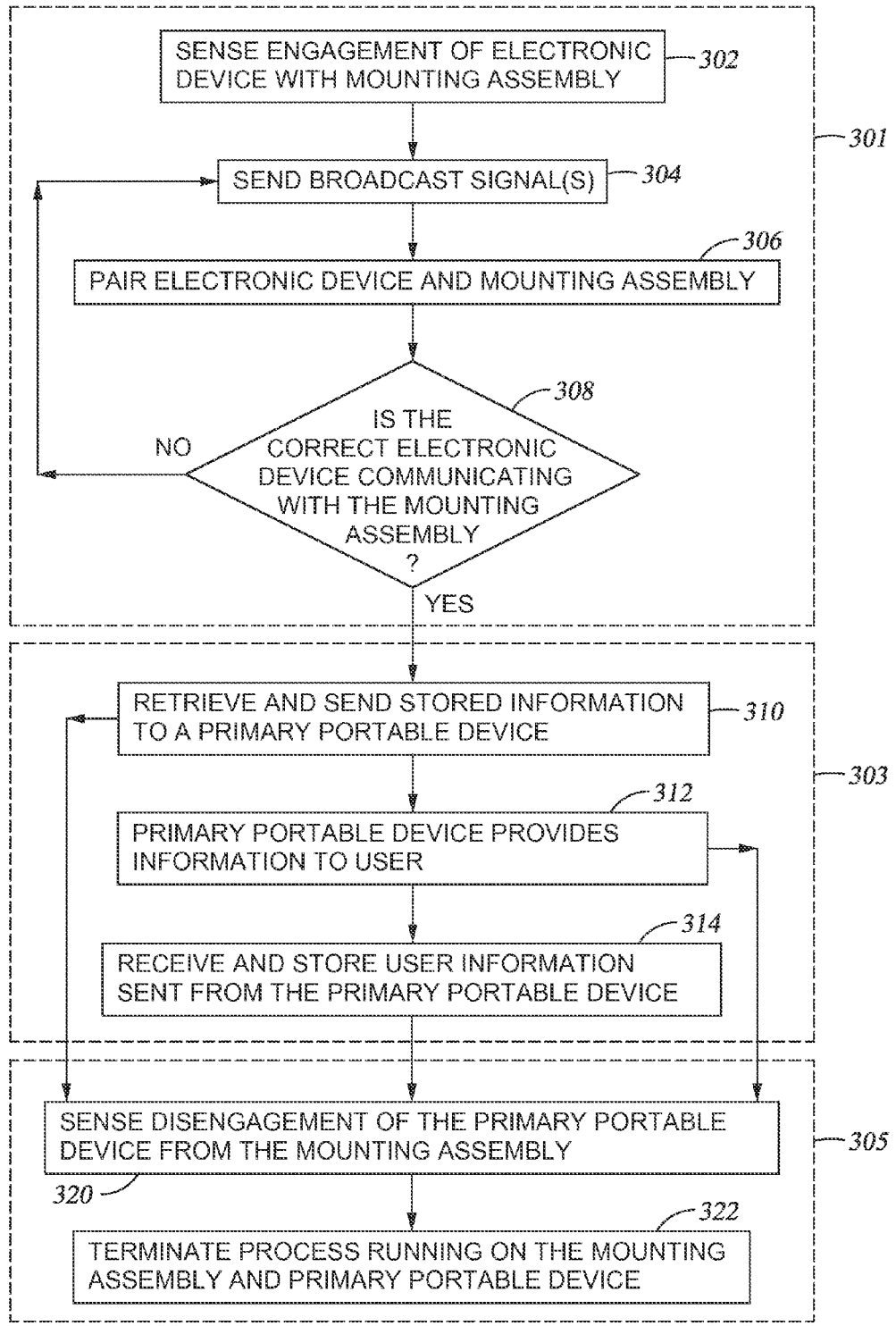
FIG. 3A illustrates a method of configuring and controlling an electronic device due to the interaction with the mounting device, according to one embodiment of the present disclosure.

FIG. 3A illustrates a process sequence 300 for configuring and/or controlling a primary portable device 105 based on the interaction of the primary portable device 105 with a mounting device 100. The process sequence 300 generally includes an initiation sequence 301, an operation sequence 303 and a termination sequence 305, which are each discussed further below. FIGS. 3B-3C and 3E-3F include examples of processing sequences that may be performed during one or more of the steps outlined in the process sequence 300.

I—Initiation Sequence

At step 302, the initiation sequence 301 portion of the process sequence 300 starts with components in the mounting assembly 102 sensing the presence of the primary portable device 105. The presence of the primary portable device 105 can be sensed by use of the sensor 117 and processor 118 when the user causes the primary portable device 105 to interact with the mounting surface 221. The data generated by the sensor 117 (e.g., acceleration data, etc.) and other useful information relating to the interaction event (e.g., timing data) can then be stored within the memory unit 122 for later use, which is often referred to below as "interaction information." Similarly, one or more sensors and one or more software applications (e.g., programs 109 or 110) running within the primary portable device 105 can collect data (e.g., "interaction information") regarding the interaction event. In some configurations, an accelerometer and/or magnetic field sensing device in the primary portable device 105 is able to detect the interaction, and allow the processor 106B to analyze and store the generated data regarding the interaction event in memory 107. In one example, a magnetic field sensing device in the primary portable device 105 is able to detect the presence of one or more of the magnets 226 in the mounting assembly 102. The information received during step 302 can be used by the processor 118 to help determine which electronic device the mounting assembly 102 should communicate with in subsequent processing steps if two or more wireless enabled portable electronic devices (e.g., primary portable device 105 or second electronic device 151) are positioned near the mounting assembly 102. Methods of determining which electronic device the mounting assembly 102 should communicate with is discussed in more detail below.

As noted above, the presence of the primary portable device 105 can be sensed by an element within the sensor 117. In one example, the sensor is used to sense the physical contact of the primary portable device 105 with the mounting surface 221. In this case, a mechanical contact type switch may be used in combination with the magnets 226 and structural element 204 to sense the presence of the primary portable device 105, and also hold the primary portable device 105 against the surface 221. In another example, an accelerometer within the sensor 117 is used to sense the physical contact of the primary portable device 105 with the mounting surface 221. However, in some embodiments of step 302, the elements in the sensor 117 may be configured to simply sense that the primary portable device 105 is in close proximity to the mounting assembly 102. In this case, a reed switch or optical sensor may be used to sense the presence of the primary portable device 105 near the mounting assembly 102.

Next, at step 304, the mounting assembly 102 generates one or more communication signals based on the sensed interaction of the primary portable device 105 and the mounting assembly 102 during step 302. The one or more communication signals are generally broadcast by the mounting assembly 102 using the wireless transceiver 120. The communication signal may be sent to the primary portable device 105 via the outgoing signal 144 (FIG. 1) via the communication link 140. In cases where there are multiple electronic devices within communication range of the mounting assembly 102, the broadcast signal may also be sent to the other devices (e.g., second electronic device 151) via separate communication links (e.g., link 150). As noted above the communication link(s) may be performed via a wired or wireless communication technique (e.g., Bluetooth classic, BTLE).

The signals broadcast during step 304 may contain information about the mounting device, the mounting device's primary control function and other useful information. The primary control function information, or mode of operation information, generally relates to information that is used by the processor in the primary portable device 105 and/or the mounting assembly 102 to help the primary portable device 105 perform some desired activity. In some cases, the primary control function information, or mode of operation information, may include information about the mounting device, such as a device's Bluetooth device ID information, serial number or other useful information.

In some configurations, the primary control function information can include information relating to the mounting device's local environment and/or its desired primary control function. A device's primary control function, which can be performed by certain software applications running on the primary portable device 105, includes a predetermined mode of operation that the primary portable device 105 is to perform while it is engaged with the mounting assembly 102. The primary control function information provided by the mounting assembly 102 can be used to select certain software applications that are to be run within the primary portable device 105. In one example, the selected software applications allow the primary portable device 105 to be safely used in an automobile environment by only allowing hands-free type software applications to be used.

The primary control function information provided by the mounting assembly 102 may also contain information that is used to enable or disable certain device features or actions that are performed by the primary portable device 105. The primary control function information may contain information that causes the software applications running on the primary portable device 105 to believe that the mounting assembly 102 is a certain type of device that has capabilities already preprogrammed into the primary portable device 105. In this case, the primary control function information can be used to define the types of input that can be received from the user and/or the modes of interaction that the user can use to interact with the primary portable device 105. In some configurations, the primary control function information is only used by the primary portable device 105 while the primary portable device 105 is engaged with the mounting assembly 102. In one example, the primary control function information contains information that causes the primary portable device 105 to believe that the mounting assembly 102 is a keyboard, thus effectively preventing, or locking out, any other related device capabilities to a user (e.g., touchscreen keyboard is blocked) so that a hands-free type environment can be created. As noted above, in some cases, the primary control function information may include information about the mounting device (e.g., Bluetooth device ID information). In this case, the software applications running on the primary portable device 105 may compare the received primary control function information with information stored in memory to determine what device features or actions are to be performed by the primary portable device 105 based on coded instructions stored in memory.

Other primary control function examples, may include controlling the software running on the primary portable device 105 so that it can act as a baby monitor, a GPS device, a home automation system enabling device or other similar useful application. In some embodiments, the act of controlling the software running on the primary portable device 105 may include launching one or more software applications that are run in the foreground or background of the primary portable device 105 or providing a software application that is used to act as a gateway between other software applications that are running in the foreground or background of the primary portable device 105. In the gateway example, the software application may act as an intermediary that manages all of the incoming data (e.g., text data, phone calls, etc.) and/or outgoing information to meet the primary portable device's desired primary control function. In some cases, the management of the data may include routing the data to one or more software applications and/or altering the incoming or outgoing data, which is used by the processor 118 and software applications to achieve the device's desired primary control function.

In some embodiments, the delivered primary control function information may at least include a device identifier code that contains information relating to the mounting device. The device identifier code information may be used by the software running on the primary portable device 105 to decide what type(s) of controlling software should be run on the primary portable device 105 to perform its desired primary control function. In some configurations, the software running on the primary portable device 105 is used to compare the received identifier code with a table of identifier code information and other related information stored in the memory of the primary portable device 105, so that the primary portable device 105 can adjust its operation to better communicate with the mounting assembly 102 and/or perform its primary control function.

Next, at step 306, the mounting assembly 102 may perform an initial pairing process commonly performed by wireless portable devices to allow them to securely communicate with each other. However, in some embodiments of the process sequence 300, the pairing process may be performed prior to or during steps 302 or 304. In step 306, the mounting assembly 102 and the primary portable device 105 are paired by use of the communication link 140 formed between the wireless transceiver 120 and the processing system 106 of the primary portable device 105. The signals transferred between the mounting assembly 102 and the primary portable device 105 may contain typical Bluetooth® type paring information, such as Bluetooth device identification (ID) information, which may be stored in memory in both the transferring and receiving devices during the paring process.

In some embodiments of step 306, the mounting assembly 102 may perform a scan of all wireless enabled electronic devices that are within communication range, and select an electronic device to pair with based on a predetermined device priority listing saved in the memory unit 122 of the mounting assembly 102. In one example, the priority list saved in the memory unit 122 is organized chronologically, such as prioritized by when each of the scanned devices last paired with the mounting assembly 102. This type of priority listing can allow the electronic device that most recently paired to the mounting assembly 102 to be selected over other resident electronic devices. The priority listing may also be organized by the most frequently used device, the type of device and/or by user input. In one example, a Bluetooth® enabled smartphone may have a higher priority than a Bluetooth® enabled tablet or other similar wireless enabled device.

In cases where there are multiple electronic devices that are within the communication range of the mounting assembly 102, the mounting assembly 102 may or may not select the correct electronic device to connect with during step 306. Thus, there is a need to determine if the mounting device is paired with and is communicating with the correct electronic device. Therefore, at step 308, the electrical components in the mounting assembly 102 and/or electrical components in the primary portable device 105 are used to determine if the correct electronic device is paired with and is communicating with the mounting assembly 102. In general, this step is used to help the mounting assembly 102 and the primary portable device 105 decide which device it should continue to work with to perform at least some of the subsequent parts of the process sequence 300.

Figure 3B:
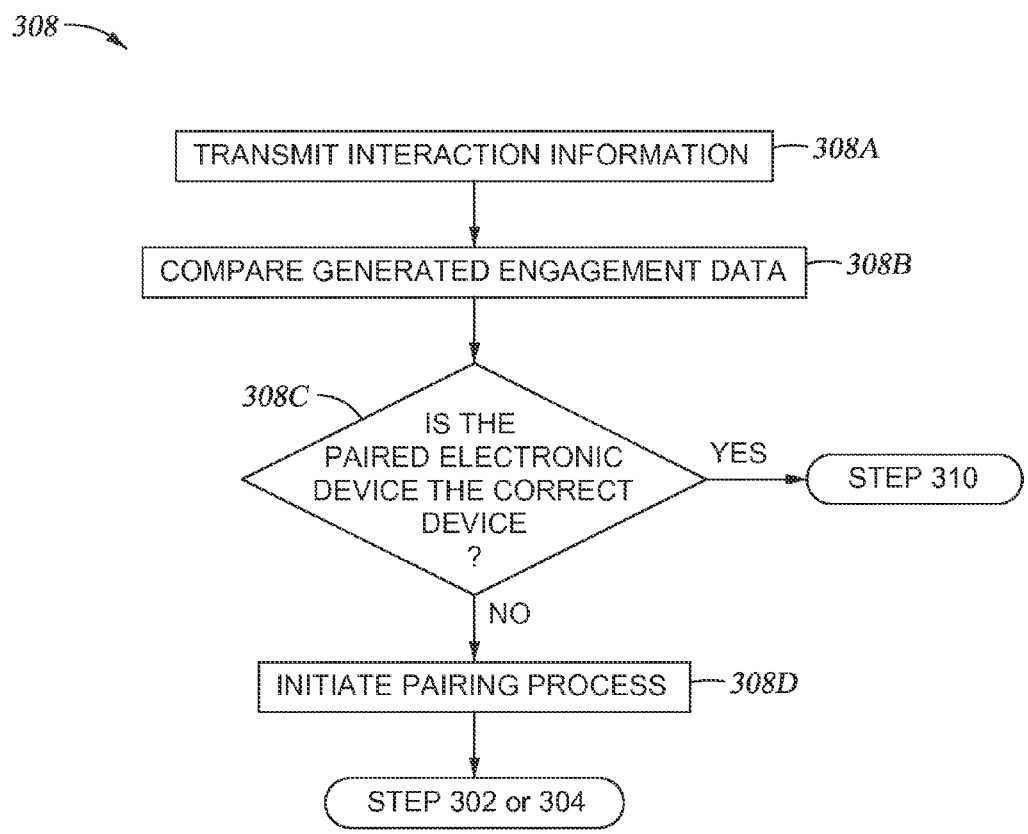
FIG. 3B illustrates a method of configuring and controlling an electronic device, according to one embodiment of the present disclosure.

Next, during step 308, the mounting assembly 102 and/or the one or more electronic devices determine which of the electronic devices the mounting assembly 102 should communicate with going forward and/or which of the electronic devices should perform a desired primary control function based on the interaction with the mounting assembly 102, as discussed above. FIG. 3B illustrates a method of determining if the correct electronic device is paired with and is communicating with the mounting assembly 102. Initially, at step 308A, the mounting assembly 102 may transmit interaction information that was generated during step 302 to one of the one or more paired electronic devices that it initially believes interacted with it during step 302. Alternately, in step 308A, at least one of the electronic devices that is paired with the mounting assembly 102 may transmit interaction information that was generated during step 302 to the mounting assembly 102.

Next, at step 308B, the interaction information received from the transmitting device is compared with interaction information generated in the receiving device to decide if the correct electronic device is paired with the mounting assembly 102. In one example, the electronic device (e.g., primary portable device 105) sends its generated interaction information to the mounting assembly 102, and the processor in the mounting assembly 102 compares and analyzes the received information with the interaction information that it generated during step 302. Alternately, in another example, the roles of the electronic device and mounting assembly 102 in step 308B may be reversed.

Next, at step 308C, the electronic device that performed the analysis of the interaction information can then make a decision whether the communication between the mounting assembly 102 and the paired electronic device should continue (i.e., the correct electronic devices are paired) and that the electronic device should begin performing some desired primary control function. During step 308C, in one interaction example, if the timing of a detected shock or measured acceleration (e.g., "bump") of the electronic device is in the same time frame as a detected shock or measured acceleration of the mounting assembly 102, then it is likely that the electronic device is positioned on the mounting assembly 102, and thus it is the device that the mounting assembly 102 is intended to communicate with going forward. In this case, the process sequence 300 will then continue on to step 310.

However, if the generated interaction information does not match, or even if no interaction information exists within the electronic device that was believed to be the one that interacted with the mounting assembly 102, then the processes performed in steps 304 and 306 will need to be completed again until the correct combination of electronic device and mounting assembly 102 are found. As illustrated at step 308D, in some configurations, the mounting assembly 102 initiates the process of pairing and communicating with one or more other electronic devices to determine which of the remaining electronic devices is positioned on the mounting assembly 102. In some embodiments, where the analysis performed during step 308B is performed by the components within the electronic device, the paired electronic device notifies the mounting assembly 102 that it is not the correct device during step 308D. After being notified, the processes performed in steps 304 and/or 306 are completed again with another electronic device before the completion of step 308 again. Alternately, in some embodiments, where the analysis performed during step 308B is performed by the components within the mounting assembly 102, the mounting assembly 102 initiates the processes found in steps 304 and/or 306 and then works with the new electronic device to perform step 308. In general, the processes performed during steps 302-308 may be completed a number of times until the correct combination of mounting assembly 102 and electronic device (i.e., primary portable device 105) are found. Once the correct combination of mounting assembly 102 and electronic device are found, the process sequence 300 will then continue on to step 310.

In an alternate version of the processes performed during step 308, the electrical components in the mounting assembly 102 are used to determine which of the multiple electronic devices the mounting assembly 102 should interact with, provide information to and/or control. In some embodiments, the electrical components may include the processor 118, wireless signal strength comparison device 121 and memory unit 122. In one example, the wireless signal strength comparison device 121 may include components that are able to detect the power level of the signals received from the multiple electronic devices that are within communication range of the mounting assembly 102 using a received signal strength indicator (RSSI) type technique, and determine which signal is the strongest. In general, since the primary portable device 105 is positioned such that it is in close proximity to the mounting assembly 102, the processor 118 will determine that the primary portable device 105 is the closest device based on its relatively high signal strength level. Based on the received signal strength information the processor 118 may decide that the primary portable device 105 is the one that should be communicated with going forward. In general, the wireless signal strength comparison device 121 is configured to deliver the derived information to the processor 118, so that the processor 118 and software application 124 can make decisions regarding which electronic device to control and the type of information that should be transferred in subsequent steps. However, in some embodiments of step 308, the determination of the position of the primary portable device 105 relative to the mounting assembly 102 is determined using RSSI type software running on the primary portable device 105 versus the mounting assembly 102. In this case, the mounting assembly 102 sends out a broadcast signal that is sensed by each of the electronic devices that are within wireless communication range. Each of the electronic devices then use a signal strength analysis technique (e.g., RSSI) to determine the signal strength of the received broadcast signal sent by the mounting assembly 102. Then each electronic device then sends information about the measured signal and information about itself back to the mounting assembly 102. The mounting assembly 102 can then use the information received from each of the electronic devices to determine which electronic device is the primary portable device 105. The processor in the primary portable device 105 can use the received information and compare it with information stored in its memory to help perform one or more subsequent steps. Once the correct combination of mounting assembly 102 and electronic device are found the process sequence 300 will then continue on to step 310.

Figure 3C:
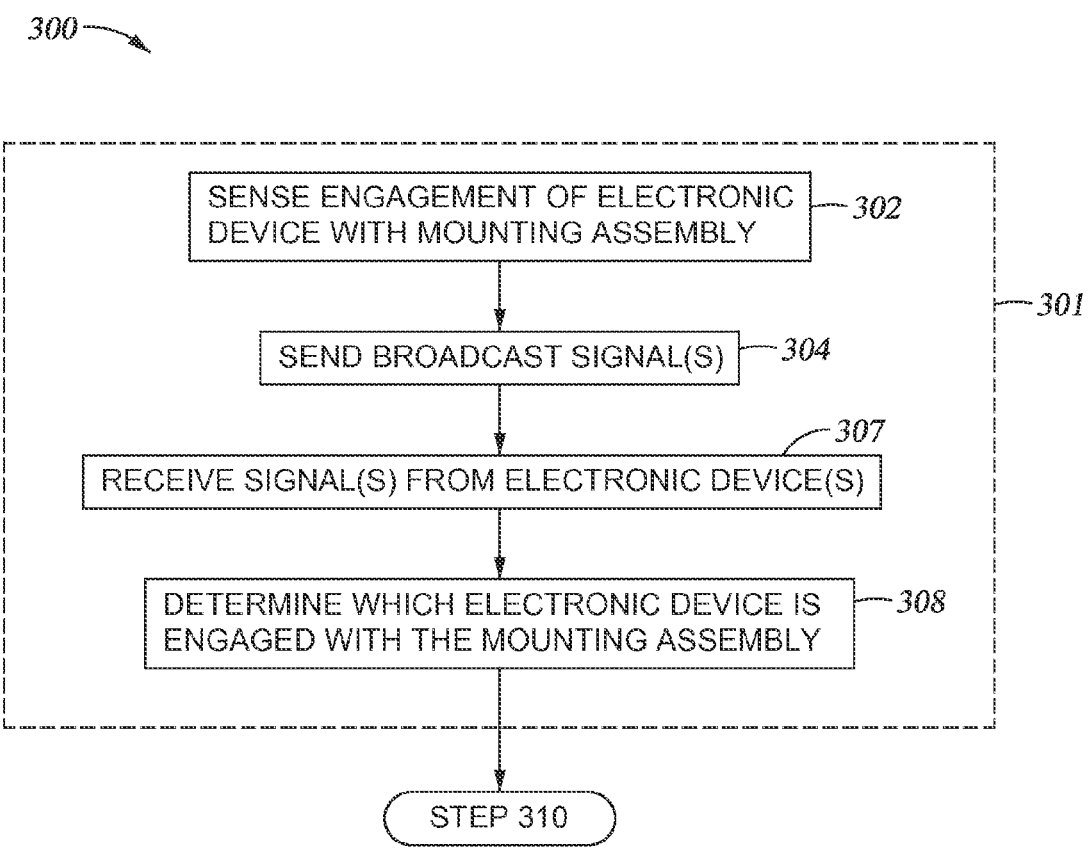
FIG. 3C illustrates an alternate method of configuring and controlling an electronic device due to the interaction with the mounting device, according to one embodiment of the present disclosure.

FIG. 3C illustrates an alternate version of the initiation sequence 301 that is used to configure and control an electronic device. In this process sequence, steps 302 and 304 are performed in a similar manner as discussed above, and are thus not restated here again. In this embodiment, the process continues from step 304 to step 307. At step 307, the mounting assembly 102 may receive one or more communication signals from the multiple electronic devices that are within communication range of the mounting assembly 102. In this step, the electronic components in the mounting assembly 102 will receive an in-coming signal 142 from the primary portable device 105 via the communication link 140 formed between the wireless transceiver 120 and the processing system 106 of the primary portable device 105. The signals received from each electronic device may contain "interaction information" and other useful information about the device (e.g., type of device) and/or software application(s) running on the device. The received signal information is then analyzed in step 308, which is discussed above, to determine which electronic device is positioned on the mounting assembly 102. Therefore, in this alternate version of the initiation sequence 301 the correct electronic device can be determined based on the input received from one or more electronic devices that are in communication with the mounting assembly 102.

II—Operation Sequence Examples

Figure 3D:
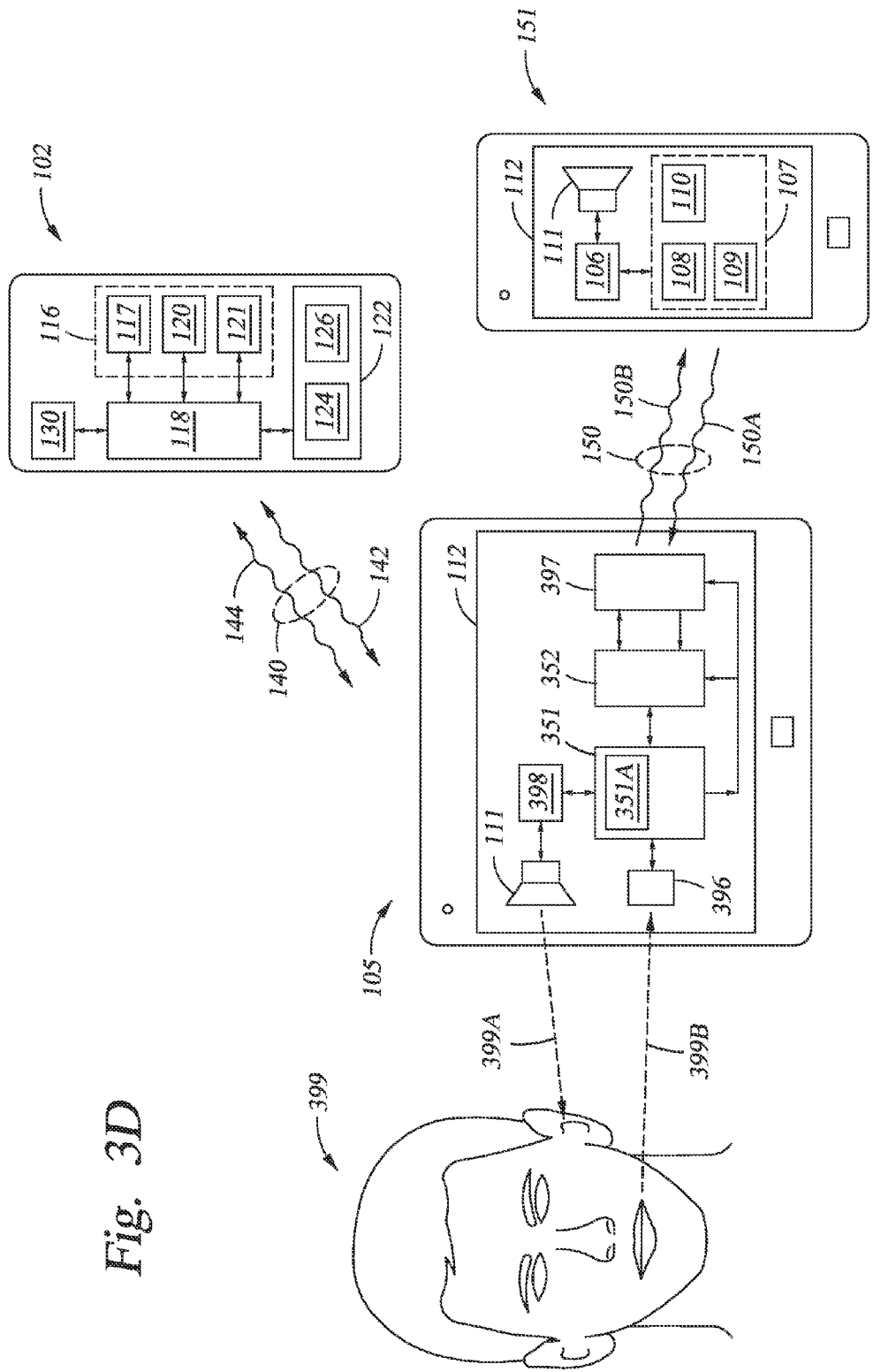
FIG. 3D illustrates one or more electronic devices and a mounting device that are interconnected using various communication links, according to one embodiment of the present disclosure.

FIG. 3D illustrates a schematic diagram of the movement of information between a primary portable device 105 and a mounting assembly 102 that are interconnected and configured to interact with a user 399 to perform one or more desirable functions during the operation sequence 303 portion of the process sequence 300. The operation sequence 303 is generally performed using the primary portable device 105, which was determined to be the electronic device that the mounting assembly 102 was intended to interact with and communicate with going forward.

At step 310, the processor 118 within the mounting assembly 102 retrieves and delivers information stored in the memory unit 122 to the primary portable device 105. The stored and delivered information will typically include information relating to the mounting device's primary control function and other useful information that enables the primary portable device 105 to provide information to the user and/or perform one or more desirable functions that are useful to the user. In one example, the delivered information includes device identifier code information and/or other primary control function type information.

In some embodiments of the process sequence 300, the mounting assembly 102 may not need to further interact with the primary portable device 105, and thus may move to an idle or low power use mode of operation until the mounting assembly 102 senses the disengagement of the primary portable device 105 from the mounting assembly 102, which is discussed below at step 320.

However, in some embodiments, after performing step 310, step 312 is performed. In step 312, one or more software applications that are running on the primary portable device 105 receive the information provided by the mounting assembly 102 and use the received information to perform some desirable function. In one example, the active software on the primary portable device 105 may cause the primary portable device 105 to only use hands-free type programs if the mounting assembly 102 is positioned in an automobile environment. One will note that the software that is actively running on the primary portable device 105 may have been brought into this state, due to the processes performed in step 304. In other words, the processes performed in step 304 can cause one or more software programs to be "launched," so that they run in the foreground or background of the primary portable device 105.

In one embodiment of the mounting device 100, one or more software applications may be loaded and stored within the memory 107 of the primary portable device 105, and can be used to facilitate the communication with the mounting assembly 102 and/or control of the primary portable device 105. The loaded software applications may include software applications that run in the foreground or background on the primary portable device 105. In some embodiments, the software may be able to function while a "lock screen" is currently being used on the primary portable device 105.

In some embodiments, during the performance of step 312, data relating to the user interaction with primary portable device 105 may be sent to and stored within the memory unit 122 of the mounting assembly 102. In some applications, the data sent can be used by the processor 118 to control future interactions between the primary portable device 105 and the mounting assembly 102. For example, in the automobile case, the primary portable device 105 may send GPS information or driving habit type information collected by the software running on the primary portable device 105 to the mounting assembly 102. The provided and stored information may then be provided to the primary portable device 105, or a second electronic device that is caused to interact with the mounting assembly 102, at some later time, such as when the primary portable device 105 is caused to re-interact with mounting assembly 102 (e.g., step 302) at a subsequent time.

Figure 3E:
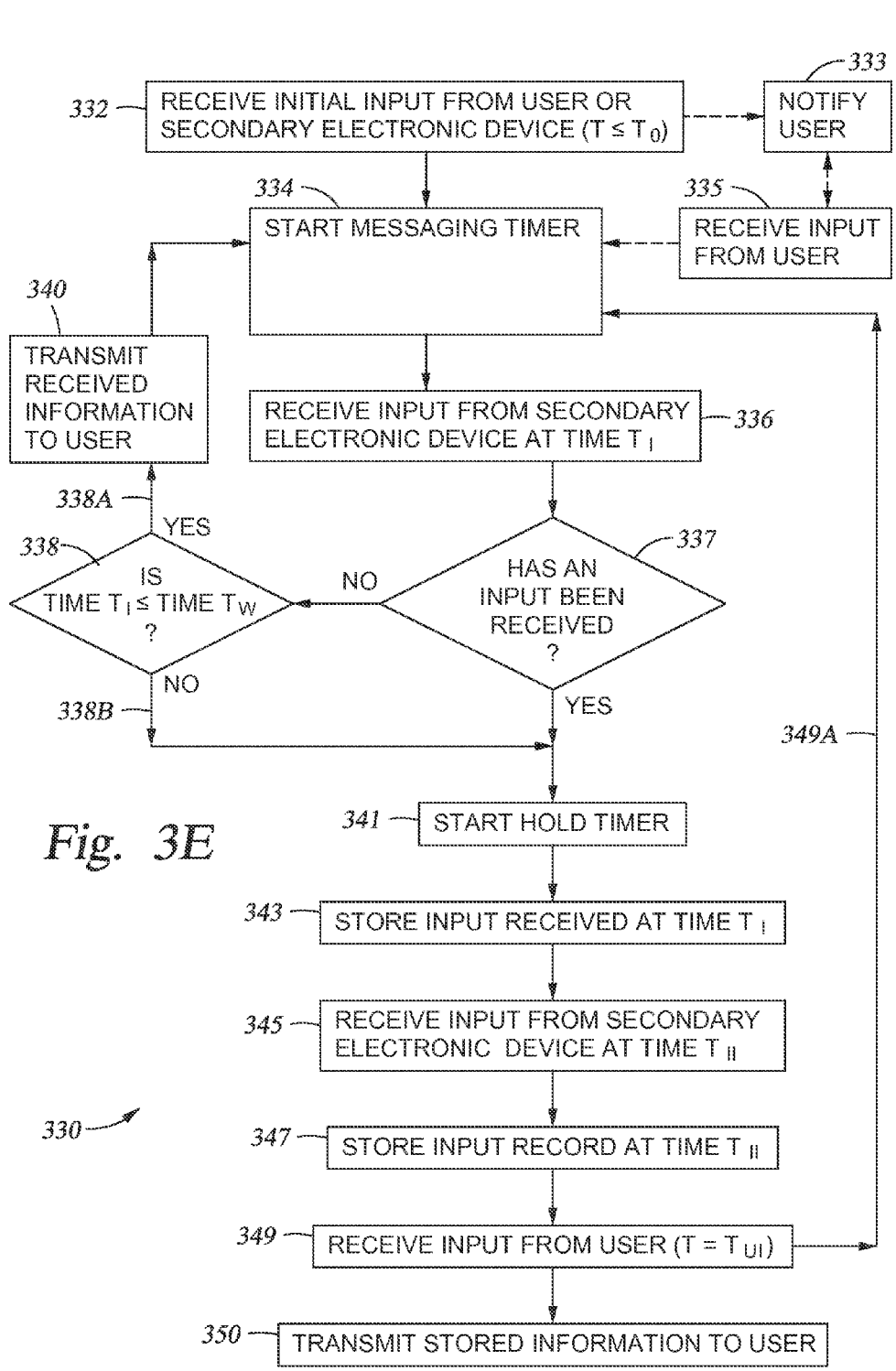
FIG. 3E illustrates a method of transferring user input between a primary portable device and a second electronic device, according to one embodiment of the present disclosure.

In an effort to provide a safe and controlled interaction between a user 399 and the primary portable device 105, it is desirable to put in place various control measures that control the flow of information between the user 399 and the primary portable device 105. FIG. 3E illustrate one example of a process sequence 330 that can be performed during at least a portion of step 312 of the process sequence 300. The process sequence 330 can be useful in cases where the primary portable device 105 is used in a situation where the user may not want to be distracted or is not in a desirable position to physically interact with the primary portable device 105. In general, the process sequence 330 is used to control the delivery of information to the user 399 during times when the user is ready to receive a communication from another electronic device (e.g., second electronic device 151). The process sequence 330 is often referred to herein as a "conversation," due to the transfer for information that is performed between the user 399 and a second electronic device. In one example, process sequence 330 can be used in an automobile, since it controls the delivery of information and thus prevents the driver from being distracted at undesirable times while driving. The processes described herein can be used to enable the hands-free use of the primary portable device 105.

In general, the process sequence 330 is performed using one or more software applications that are run on or within the primary portable device 105. The software applications, or programs 109 and 110 (FIG. 1), may include software that is configured to run in the foreground or background on the primary portable devices 105. The software applications may also be run while other software applications are run in the foreground or background of the primary portable device 105. In one example, other software applications running of the primary portable device 105 may include, but are not limited to, electronic messaging programs, GPS applications, e-mail applications or other useful software applications. Electronic messaging programs may include the delivery of messages containing text, emoticons, Mogs, images, video, and/or sound content, which are often known as MMS messages.

Referring to FIG. 3E, at step 332, the primary portable device 105 receives input from the user or from a second electronic device 151. In the user input case, the primary portable device 105 receives physical or non-physical (e.g., audible) input 399B from the user 399. In one example, an input device 396, such as a microphone or touch sensing display element, is able to detect an input from the user 399. In the case where input is received from the second electronic device 151, the primary portable device 105 may deliver a notification during step 333 (e.g., input 399A (FIG. 3D)) of the received input to the user 399. The user may then provide a positive input 335 via input 399B (FIG. 3D) to the primary portable device 105 letting it know that the user intends to interact with the primary portable device 105, and thus continue the conversation. The notification, or input 399A, may be an audible signal and/or visual signal that is generated by and/or displayed on the primary portable device 105.

At step 334, the processor 106B in the processing system 106 (FIG. 1) of the primary portable device 105 initiates a "messaging" timer (time $T_0$) based on the receipt of the input received during step 332. The timing function may be performed by one or more timing devices disposed within the primary portable device 105. In general, the term "timer," as used herein, is a process that a processor uses to measure, monitor or determine that an amount of time has passed. In some examples, the timer may be a count-down timer, a count-up timer or any other method that allows the processor to determine that an amount of time has passed.

At step 336, the primary portable device 105 receives input from a second electronic device 151 at an input time $T_I$ after the timer was initiated (time $T_0$). The received input, as with the input received during step 332, may be delivered to the primary portable device 105 via the communication link 150.

In some embodiments of the process sequence 330, if the user provides an input to the primary portable device 105 before step 336 is performed, the processor in the primary portable device 105 may restart or re-initiate the timer (time $T_0'$) based on the receipt of the additional users input. In this case, the input time $T_I$ is generated based on the re-initiated timer (i.e., difference between $T_0'$ and $T_I$) versus the timer initiated during step 334 (i.e., difference between $T_0$ and $T_I$).

In cases where the user does not want to be disturbed or continue the conversation initiated in step 332, the user can provide a "negative" or "conversation ending" input to the primary portable device 105. Therefore, at step 337, the processor within the primary portable device 105 checks to see if a "conversation ending" input has been received from the user 399. The "conversation ending" input can take any discernable form, such as an audible response that contains information that the user does not intend to continue the conversation or some physical interaction information that is provided by the user 399 (e.g., user presses a cancel button displayed on a touch screen, a button on the device is pressed, etc.). The "conversation ending" audible response may be determined by use of voice recognition program running on the portable electronic device that determines that a "conversation ending" command was received. The "conversation ending" input may cause a flag to be set within the software 351 (FIG. 3D), and thus automatically cause the process sequence 300 to subsequently automatically jump to steps 345-350, which are discussed below.

At step 338, the processor within the primary portable device 105 compares the input time $T_I$ with a stored input time window $T_W$ value so that the processor can decide whether to provide or not provide the received input to the user. In general, the input time window $T_W$ is an allotted amount of time that the processor uses to decide, based on user and/or software application defined rules, how it should handle the received information. In one example, if the input time $T_I$ exceeds the value of the time window $T_W$, the received input is likely not a part of an on-going conversation, or is considered to be "stale," so the primary portable device 105 will not deliver the input to the user, as illustrated by following path 338B. In one example, the input time window $T_W$ value is set between about 0.5 and about 10 minutes, such as about 2 minutes. In some embodiments, the processor may set a window expiration flag in the software when the input time window $T_W$ time has been reached. The window expiration flag may be used by the software to rapidly know that the timer has reached and exceeded the input time window $T_W$. The window expiration flag may cause the process sequence 300 to subsequently automatically jump to step 338 and follow steps 345-350, which are discussed below.

If the input time $T_I$ is less or equal to the input time window $T_W$ value then, at step 340, the primary portable device 105 may deliver a notification (e.g., input 399A (FIG. 3D)) of the received input to the user 399. In some cases, the decisions whether the input is provided to the user 399 via input 399A is based on the type of data received during step 332. The process may then continue following path 340A to step 334 due to a user generated response to the received input (step 336). If the primary portable device 105 receives another input from at least the second electronic device 151 before the user responds to the input received during step 336, the primary portable device 105 may then perform step 338 by comparing the time that the additional input was received (e.g., time $T_I'$) with the input time window $T_W$ so that the appropriate path 338A or 338B can be determined based on the timing of the receipt of this additional input. In some configurations, an input received from the second electronic device 151 is used to re-initiate the timer, extend the length of the input time window $T_W$ or cause the timer to pause for a desired period of time to allow related messages to be received by the user and allow the user time to respond to the received message.

However, if the input time $T_I$ is greater than the input time window $T_W$ value then the process will continue at step 341. At step 341, the processor in the primary portable device 105 initiates an "information hold" timer based on the receipt of a "conversation ending" input received during step 337 or the determination that the time $T_I$ is greater than the input time window $T_W$.

At step 343, the primary portable device 105 stores the information received at time $T_I$ within the memory unit 107 (FIG. 1). If the primary portable device 105 then receives another input from at least the second electronic device 151, such as an input that is received at a time $T_{II}$ (i.e., step 345), then the primary portable device 105 stores the received information within the memory unit 107 (i.e., performs step 347). In some embodiments, the decision to perform step 347 may be based on re-performing step 338 in which the time $T_{II}$ is compared with the input time window $T_W$ value. However, in some cases, the processor may automatically determine that any newly received input will be automatically stored in a memory location, since the input time window $T_W$ has elapsed and the user has not provided additional input.

If the primary portable device 105 then receives input from the user 399 at some later time, such as at a time $T_{UI}$ (i.e., step 349), the primary portable device 105 may then initiate the timer by performing step 334 (see path 349A) and the prior inputs that were stored in the memory unit 107 during steps 343 and/or 347 may be delivered to the user 399 at step 350. In some cases, the decisions whether the stored input is provided to the user 399 via input 399A is based on the type of data received during steps 336 and 345. If additional inputs are then received, then steps 338 and step 340 or steps 343-350 may be performed again.

In some embodiments of the process sequence 330, during the performance of one or more of the steps 343-349 the processor within the primary portable device 105 may determine that the information hold timer started in step 341 has reached a desired hold time $T_H$, which may be a constant that is stored in memory. If the hold timer has reached the predetermined hold time $T_H$, the processor may deliver a notification of the input(s) received in steps 343-349 to the user 399. The user may then provide an input (e.g., input 399B (FIG. 3D)) to the primary portable device 105 letting it know whether the user intends to receive the stored input(s) and/or interact with the primary portable device 105. The notification, which may be similar to the notification performed in step 333, may be an audible signal and/or visual signal that is generated by and/or displayed on the primary portable device 105. If the user confirms that he/she wishes to receive the stored inputs the process sequence may then restart at step 332. However, if the user confirms that he/she does not wish to receive the stored inputs, the process sequence may then complete one or more of the steps 341-350 again.

Information Transfer and Control Examples

Figure 3F:
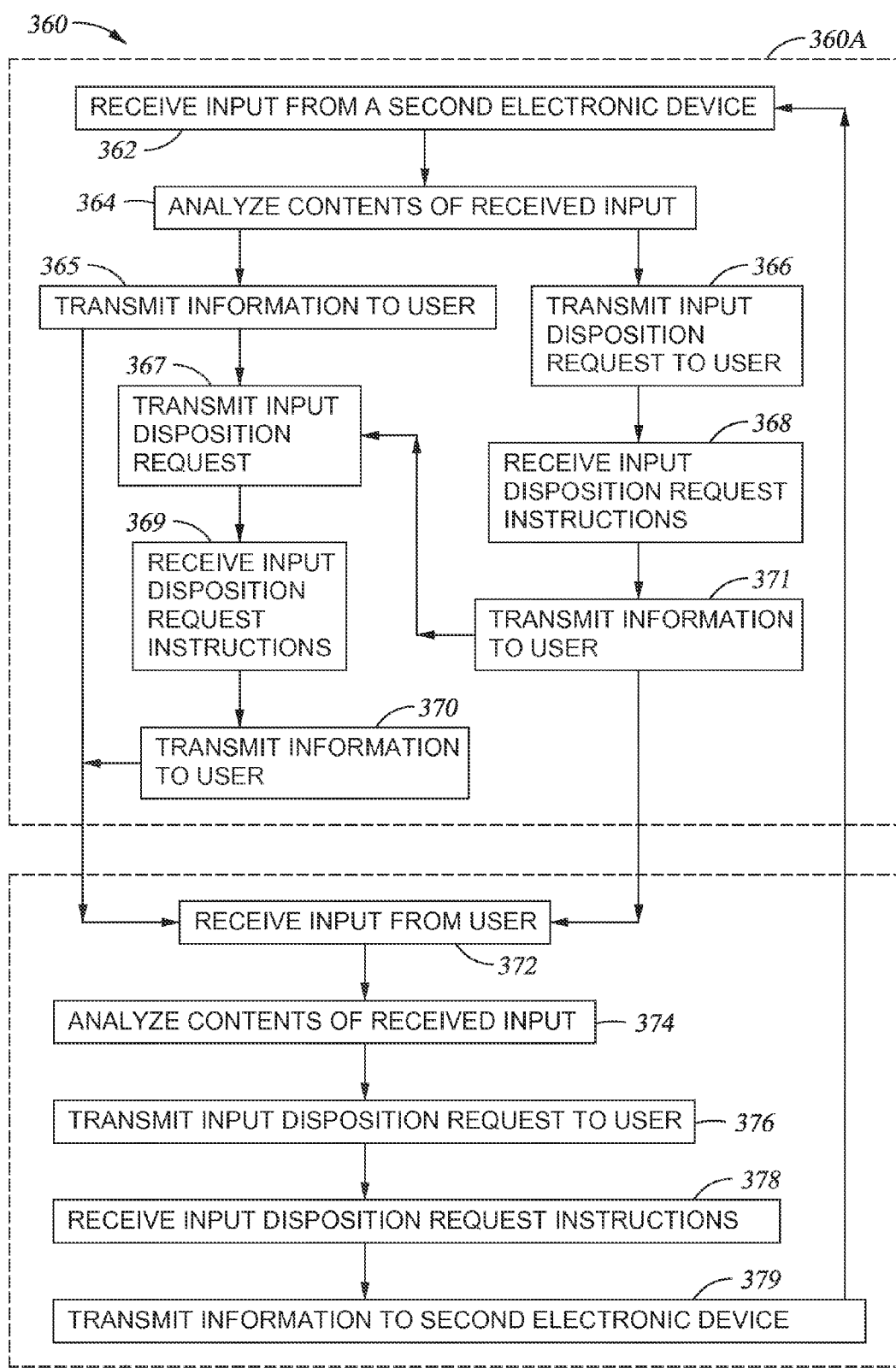
FIG. 3F illustrates a method of controlling the delivery of information between a user and a primary portable device that is in communication with a second electronic device, according to one embodiment of the present disclosure.

FIG. 3F illustrates process sequence 360 that is used to control the transfer of information between a user 399 and the primary portable device 105, which is in communication with the second electronic device 151. The process sequence 360 generally includes an external device information control process sequence 360A and a user information control process sequence 360B. While FIG. 3F depicts the process sequence 360A being performed before process sequence 360B, this configuration is not intended to be limiting as to the scope of the disclosure provided herein, since the process sequence 360 may start with step 372 of the process sequence 360B instead of starting with step 362 of the process sequence 360A. In other words, in some cases, the process sequence 360 starts with the primary portable device 105 receiving initial input from the user 399 versus receiving input from a second electronic device 151, or vice versa. In some embodiments, the process sequence 360 may only include the completion of either process sequence 360A or process sequence 360B. In other embodiments, the process sequence 360 may include the completion of process sequence 360A and process sequence 360B multiple times, where either process sequence 360A or 360B need not be performed the same number of times or even one after the other.

In general, the various parts of the process sequence 360 are performed by one or more software applications 351 (FIG. 3D) running within the primary portable device 105 to enhance the user experience and usefulness of the data transferred between the user 399 and/or the second electronic device 151. In some cases, the one or more software applications 351 may form part of at least one of the software applications 109 or 110, which are discussed above.

In some embodiments, the one or more software applications 351 acts as an intermediary that controls the transfer of information between the user 399 and/or the second electronic device 151, as illustrated in FIG. 3D. In one configuration, the one or more software applications 351 are adapted to receive information from another software application 352 that is running in the foreground or background of the primary portable device 105 and transfer the information to the user 399 using the I/O components 398, speaker 111 and/or display device 112 via the input 399A path. The software application 352 may include a communication program, such as an electronic messaging program (e.g., texting program), an e-mail program, or other useful electronic communication application that is configured to receive information from the second electronic device 151 using the communication link 150 and a transceiver 397. The one or more software applications 351 may also be adapted to direct information received from the user 399 via input 399B and input device 396 to the software application 352, which then retransmits the information to the second electronic device 151 using the transceiver 397. Alternately, the one or more software applications 351 may be adapted to cause information received from the user 399 via the input device 396 to be transferred to the second electronic device 151 via the transceiver 397 without using the software application 352 as an intermediary.

Process Sequence Examples

Referring to FIGS. 3D and 3F, at step 362, the process sequence 360A of the process sequence 360 starts with the primary portable device 105 receiving input from a second electronic device 151. In this configuration, the primary portable device 105 receives information from the second electronic device 151 via the communication link 150 (FIG. 3D). The information received from the second electronic device 151 may include a multimedia message, text message, e-mail or other form of electronic messaging transferred between the electronic devices.

Next, at step 364, the processor and the one or more software applications 351 are used to analyze the information being transferred between the second electronic device 151 and the user 399 to determine whether the transferred information contains some desired attribute or feature. Desired attributes or features of the transferred information may include "application data" about the user of the second electronic device or the primary portable device (e.g., user 399), questions being asked of the user of the primary portable device, information relating to the global position of the user of the second electronic device or the primary portable device, information relating to information stored within the primary portable device 105 or other useful information that may be transferred via electronic means.

In some configurations, the one or more software applications 351 contain an analysis module 351A (FIG. 3D) that is used to parse the information received from various software applications and/or hardware running on the primary portable device 105. In one example, the information that is to be parsed is received from another software application 352 running on the primary portable device 105, incoming data received from the transceiver 397, user information transferred from the input device 396, and/or user information received from a touch display on the primary portable device 105. During the parsing process, the software application performing the analysis may look for certain types of "application data" within the transferred information, such as certain keywords, temporal or alpha-numeric information patterns, or other useful information (e.g., GPS coordinates). Once the analysis module 351A has determined that a desired type of application data is within the transferred information, the software application can work with the processor to perform some desired function on the primary portable device. In some configurations, the analysis module 351A determines, based on the received application data, application information, such as a software application, user information, device information or other useful stored information, is to be retrieved from the memory of the primary portable device 105 and then utilized in a desired way. In some configurations, the desirable functions may include a process that supplements at least a portion of the information being transferred between devices or cause other software applications to be launched that allow additional desired tasks to be performed by the primary portable device 105 based on the contents of the information that was received during step 362.

At step 365, in the case where the information that is being analyzed is information that was received from the second electronic device 151, at some point within step 364, at least portion of the information that was received in step 362 is provided to the user via the input 399A path (FIG. 3D). In one example, a text message that is received from the second electronic device 151 may be transferred from an electronic form to an audible form using a text-to-speech type software application. Alternately, the one or more software applications 351 may simply notify the user via input 399A that a text message has been received from the second electronic device 151. In some embodiments, the process may then continue at step 372 of the process sequence 360B. In other embodiments, the process may then continue to steps 367 and 369.

At step 367, the one or more software applications 351 will then transmit an input disposition request to the user that is based on the analysis performed in step 364. The input disposition request is a visual or audible request that is generated and delivered to the user which typically requires some user confirmatory input to cause some subsequent action to be performed by the primary portable device 105. The input disposition request typically asks whether the user would like the primary portable device 105 to perform some additional useful function or task based on the analysis performed in step 364 on the transferred information. In one example, if the analysis module 351A determines that a phone number, or a reference to a phone number, was application data provided in the information sent from the second electronic device 151, the processor and one or more software applications 351 may cause an input disposition request to be sent to the user via input 399A asking him/her if they would like the primary portable device 105 to call the referenced phone number.

Next, at step 369, the user 399 may provide a confirmatory answer to the input disposition request via an input 399B. Depending on the response, or confirmatory answer, the primary portable device 105 may or may not perform the task raised in the input disposition request found in step 367. In one example, if the input disposition request asked the user if they would like the primary portable device 105 to call a phone number, and the user's answer was "yes," then the primary portable device 105 will initiate a call with the associated phone number. In some embodiments of the process sequence 360, the process may then continue at step 372 within the process sequence 360B.

In some embodiments, at step 370, the process sequence 360 includes the retrieval of information from the memory 107 or from another program running on the primary portable device 105, based on the application data found during step 364, and then the transmission of the retrieved information to the user 399 via the input 399A path. The retrieved information may include information relating to a communication application, contact information, pictures or other useful information. Step 370 may also include the process of causing one or more software applications stored in memory to be launched based on the application data found during step 364. The launched software application(s) may provide some desirable information to the user or perform some desirable function for the user.

However, in a first alternate version of the process sequence 360, after performing step 364 the process sequence then continues on to steps 366, 368 and 371. In this case, during step 366, the one or more software applications 351 then transmit an input disposition request to the user that asks the user 399 whether he/she would like to receive the information received during step 362. Then, during step 368, the user provides a response regarding whether or whether not he/she would like to receive the information delivered during step 362. If the answer is "yes", then the process then continues on to step 371, where at least portion of the information that was received during step 362 is provided to the user 399 via the input 399A path. In some embodiments, information that was received from the second electronic device 151 is converted by the one or more software applications 351 into an audio file or is displayed on a displaying element on the primary portable device 105 that is then delivered to the user 399. In other embodiments of the process sequence 360, the process may then continue on to steps 367 and 369, which are discussed above. In some embodiments of the process sequence 360, the process may then continue to step 372 of process sequence 360B.

In some embodiments, step 371 may also include the process of retrieving information from the memory or another program running on the primary portable device 105 based on the application data found during step 364 and then transmitting the retrieved information to the user 399 via the input 399A path. In some embodiments, step 371 may also include the process of causing one or more software applications stored in memory to be launched based on the application data found during step 364. The launched software application(s) may provide some desirable information to the user or perform some desirable function for the user.

At step 372, which is the initial step in the process sequence 360B, the primary portable device 105 receives input from the user 399. In this case, the primary portable device 105 receives physical or non-physical (e.g., audible) input 399B from the user 399.

Next, at step 374, the processor and the one or more software applications 351 are used to analyze the information being transferred between the user 399 and the second electronic device 151 to determine whether the transferred information contains application data, as discussed above in step 364. As similarly discussed above, an analysis module 351A (FIG. 3D) can be used to parse the received information to determine if the received information contains certain types of application data, such as keywords, temporal or alphanumeric information patterns, or other useful information so that the analysis module 351A can work with the processor to cause some desired function to be performed. The desirable functions may include a process that supplements at least a portion of the information being transferred or cause other software applications to be launched that allow additional desired tasks to be performed by the primary portable device 105 based on the contents of the information that is being transferred between the user 399 and the second electronic device 151.

Next, during step 376, the one or more software applications 351 then transmit an input disposition request to the user that is based on the analysis performed in step 374. As similarly discussed above, the input disposition request may be a visual or audible request that determines whether the user would like the primary portable device 105 to perform some additional useful function or task based on the analysis performed on the input received from the analysis of the information received from the user. Additionally, the analysis module 351A may determine that the information provided by the user in step 372 is referencing some useful data stored within the primary portable device 105 or some other desired process that can be performed by the primary portable device 105 or the second electronic device 151. In this case, the one or more software applications 351 may add additional data to the information that was received during step 372, so that the additional data can be provided to the second electronic device 151 during step 379, which is discussed below. The additional data may include information relating to the electronic device, audio files, pictures, the user's personal information (e.g., phone number), the user's current environment (e.g., time, position), information stored in the primary portable device 105 or other useful information. In one example, the analysis module 351A determines that the user has referenced his/hers current GPS location, and thus the processor and one or more software applications 351 may cause an input disposition request to be sent to the user asking him/her if they would like the primary portable device 105 to provide the user's GPS position within the information that is to be transferred during step 379.

In some embodiments, during step 376, the one or more software applications 351 are configured to enable some additional functionality of the primary portable device 105, such as launch one or more software applications, based on the analysis performed during step 374. The one or more software applications 351 may transmit an input disposition request and/or launch one or more software applications based on the analysis performed during step 374. In one example, based on the analysis performed during step 374, the one or more software applications 351 determine that the provided application data included a reference to or instructions to open a dialing program, texting program, GPS program, or other useful program, and thus the one or more software applications 351 then make this functionality available to the user.

Then, during step 378, the user provides a response regarding whether or whether not he/she would like the portable electronic device 105 to perform some useful function as similarly discussed above in conjunction with steps 368 or 369. In one example, if the input disposition request asked the user if they would like the primary portable device 105 to provide their GPS location, and the user's answer was "yes," then the primary portable device 105 will supplement or augment the information received in step 372 with this additional data (e.g., link to GPS sharing site, actual GPS coordinates, etc.).

Next, at step 379, at least a portion of the information that was received during step 372 and augmented during step 378 is transferred to the second electronic device 151 via the communication link 150. In some embodiments, audible information that was received from the user 399 during step 372 is converted, using the one or more software applications 351, into an alphanumeric text file (e.g., SMS text file, MMS file) or an audio file that is then delivered to the second electronic device 151 via the communication link 150. However, in some embodiments, audible information that was received from the user 399 during step 372 is converted into an alphanumeric containing text file (e.g., SMS text file) and an audio file, which are then both delivered to the second electronic device 151 via the communication link 150. Transferring both the alphanumeric containing text file and an audio file can be useful since it provides the second electronic device 151 with multiple ways to deliver the transferred information from the second electronic device 151 to an alternate user. Also, delivering both the alphanumeric containing text file and an audio file can be used to reduce the risk that the transferred information will be received in a non-useable state at the second electronic device 151 due to data corruption during the data transfer process.

In some embodiments, step 379 may also include the process of retrieving information from the memory of the primary portable device 105 based on the application data found during step 374 and then transmitting the retrieved information to the second electronic device 151. In some embodiments, step 379 may also include the process of causing one or more software applications stored in memory of the second electronic device 151 to be launched based on the application data found during step 374. The launched software application(s) may provide some desirable information to or perform some desirable function for the user of the second electronic device 151. In one example, the launched software application is configured to convert the received information to audio information that is delivered to the user.

In some embodiments of the process sequence 360, the process may start over again at step 362 after subsequent information is received from the second electronic device 151. The decision as to how the primary portable device 105 will handle the receipt of the new information from the second electronic device 151 may be governed by the process sequence 330, which is described above.

In some embodiments of the process sequence 360, one or more of the "transmit information to user" steps, such as steps 365, 370 or 371, or "transmit information to the second electronic device" steps, such as step 379, may include a "confirmation window" that allows the user a set period of time to provide input that will halt or alter the transmission of information before it is transmitted to the desired device. During these transmit information steps, the processor within the primary portable device 105 starts a timer once the transmit information step has been reached in the process sequence and holds the transmission of the information until a confirmation window time limit has been reached. In some configurations, the user can simply halt or alter the transmission of information by providing audible or touch type information to the primary portable device 105 before the confirmation window time limit has been reached by the timer. The "confirmation window" thus allows the user a set period of time to correct or halt the transmission of information that he/she does not want to be sent. In general, the confirmation window time limit can be set by the user, device manufacturer and/or by software application defined rules. In one example, the confirmation window time limit value is set to a value between about 1 second and about 1 minute, such as about 3 seconds.

III—Termination Sequence Examples

Referring back to FIG. 3A, after the primary portable device 105 has performed its desired task the user may then wish to disengage the primary portable device 105 from the mounting assembly 102. One will note that the terms "engagement" and "disengagement," as used herein, are not intended to require a physical interaction of the primary portable device 105 and the mounting assembly 102, and in some cases may only require the wireless communication link be created or terminated, or simply signify the beginning or end of the ability of the sensor 117 to sense the position of primary portable device 105 relative to the mounting assembly 102. Thus, in some embodiments of the process sequence 300, during step 320, the sensor 117 and processor 118 are used to sense the removal of the primary portable device 105 from a position proximate to the mounting assembly 102. In some cases, by sensing the termination of the communication link 140 or by receiving notification from the sensor 117, the processor 118 is able to sense the disengagement of the primary portable device 105 from the mounting assembly 102. Similarly, the primary portable device 105 may sense the disengagement by sensing the termination of the communication link 140 or by receiving of a separate broadcast signal that is sent from the mounting assembly 102 after the mounting assembly 102 has sensed the disengagement of the two components from each other.

Next, at step 322, after the sensor 117 has determined that the primary portable device 105 has been disengaged from the mounting assembly 102, one or more processes running on the primary portable device 105 and/or the mounting assembly 102 are terminated. The termination of the communication link 140 or receipt of the ending broadcast signal by the primary portable device 105, which is completed during step 320, can then be used to cause the software running within the primary portable device 105 and the mounting assembly 102 to be terminated. The process of terminating the software running on the primary portable device 105 and the mounting assembly 102 can save the battery life of both devices, and cause the device controlling programs running on the primary portable device 105 to relinquish control over portions of the software running therein. In some applications, the relinquishment of control can be important to allow the primary portable device 105 to once again function normally, such as allow the primary portable device 105 to go from a safety restrictive type hands-free mode of operation to a normal mode of operation.

In some embodiments of step 322, the primary portable device 105 may send data to the mounting assembly 102, which can be stored in the memory unit 122 and used by the mounting assembly 102 to control future interactions between the primary portable device 105 and the mounting assembly 102. In some embodiments, the information sent to the mounting assembly 102 may also be also stored in the memory of the primary portable device 105 for future use. The information sent to the mounting assembly 102 and/or stored in the primary portable device 105, may include current time stamp information, GPS location information, user's driving habit information, information about the user, or other useful information.

Alternately, in some embodiments of the process sequence 300, the mounting assembly 102 may not need to perform step 302, in which it senses the presence of the primary portable device 105, since a remote switch 190 (FIG. 1) can be used to send a triggering signal to the mounting assembly 102. The delivery of the triggering signal is used to let the mounting assembly 102 know that the primary portable device 105 is positioned proximate to the mounting assembly 102. In this case, the user can manually deliver input to a sensor 191 (e.g., mechanical switch) in the remote switch 190, which is then received and transferred by a wired or wireless transmitter formed in the processing system 192 to the mounting assembly 102 via a communication link 160. The received user input can then be used to replace a sensed engagement signal created during step 302, and thus allow the one or more steps 304-322 to then be performed. Similarly, in some embodiments of the process sequence 300, the mounting assembly 102 may not need to perform step 320, in which it senses the disengagement of the primary portable device 105 from the mounting assembly 102. In this case, user input provided from the remote switch 190 can be used to send a disengagement signal to the mounting assembly 102, letting the mounting assembly 102 know that the primary portable device 105 has been removed from the mounting assembly 102. In some configurations, the remote switch 190 may simply contain the sensor 191 and processing system 192. The processing system 192 may include a wireless transceiver (not shown), battery (not shown) and various I/O components that are used to at least deliver user input to the mounting assembly 102 via one-way or two-way communication.

Mounting Device System Configuration Examples

Figure 4A:
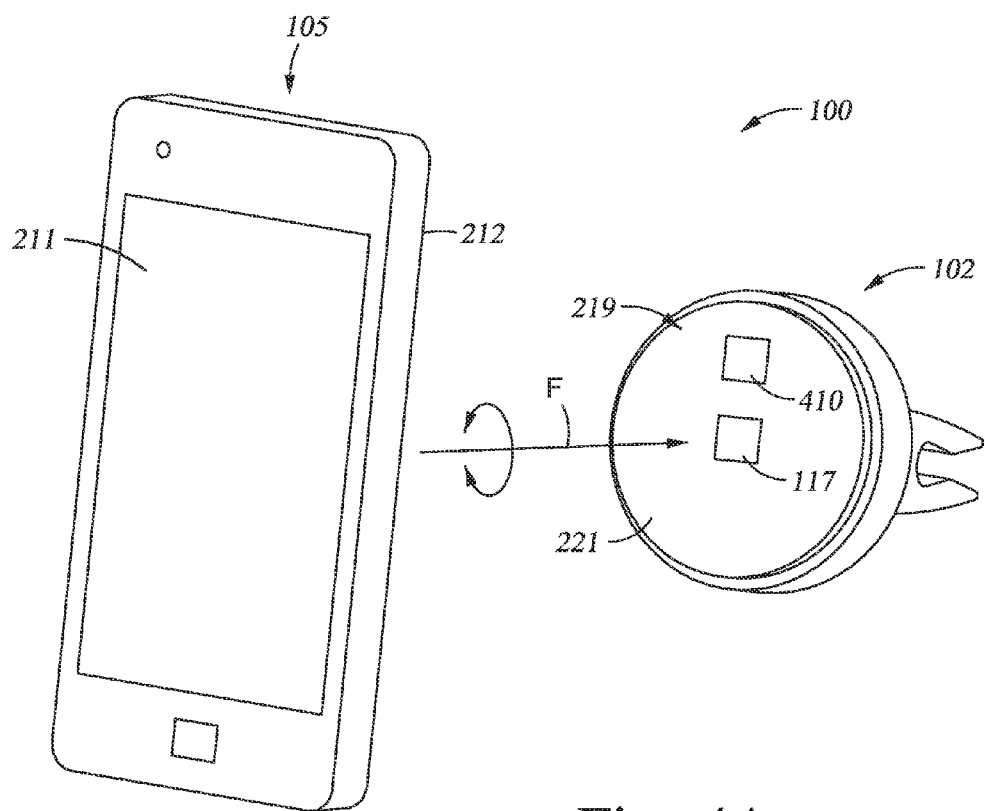
FIG. 4A illustrates an electronic device and a mounting device, according to one embodiment of the present disclosure.

FIG. 4A schematically illustrates a mounting device 100 that is configured to use attributes of the mounting region 219 of the mounting device 100 to determine the orientation of the primary portable device 105 relative to the mounting region 219. The information relating to the determined orientation of the primary portable device 105 can be delivered to the primary portable device 105 so that the software running on the primary portable device 105 can use the orientation information to alter or provide input to the one or more software applications that are running on the primary portable device 105. In some embodiments, the mounting assembly 102 of the mounting device 100 may further include a second sensor 410 that is used in combination with the sensor 117 to determine the orientation of the primary portable device 105. In some embodiments, the sensor 410 may include the same or similar components used to the sensor 117 that is discussed above. In one example, if the primary portable device 105 is a smart-phone the detection of the orientation may include determining if the smart-phone is in a portrait (e.g., vertically oriented) or landscape orientation (e.g., horizontally oriented) relative to the surface 221.

Figure 4B:
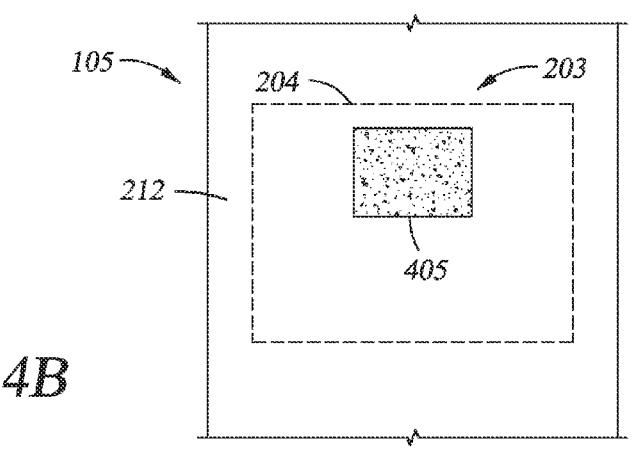
FIG. 4B illustrates a rear surface of the electronic device illustrated in FIG. 4A, according to one embodiment of the present invention.

In some configurations, as shown in FIG. 4B, the structural element 204 disposed on the rear surface 212 of the primary portable device 105 contains a region 405 that is positioned and oriented so that the relative positions of the sensors 117 and 410 can be used to determine the orientation of the primary portable device 105 when the mounting region 203 is brought into contact with surface 221. The rear surface 212 of the primary portable device 105 is typically opposite to a front surface 211. In one example, the region 405 may include magnetic materials that are adapted to be sensed by the sensor 410 when the primary portable device 105 is oriented in a first orientation and not to be sensed when the primary portable device 105 is oriented in a second orientation (e.g., rotated 90 degrees from the first orientation relative to the surface 221). In another example, the region 405 may have a different optical characteristic than the other portions of the structural element 204 or rear surface 212 of the primary portable device 105, thus allowing the sensor 410 to determine the orientation of the primary portable device 105 depending on whether the optical sensor in the sensor can view the region 405 in a certain orientation. The sensors 410 and 117 may also use the force F created between the primary portable device 105 and the mounting assembly 102 to determine the orientation of the components.

However, in some configurations, the orientation of the primary portable device 105 relative to the mounting region 219 is determined by use of position or orientation determining elements (e.g., gyroscope or GPS type elements) provided within the primary portable device 105. In this case, the orientation of the primary portable device 105 can be determined and sent to the control software running on the primary portable device 105 from the position or orientation determining elements in the primary portable device 105. The received information can then be used to alter or provide input to the one or more software applications that are running on the primary portable device 105 to perform some alternate or other useful function.

Figure 5A:
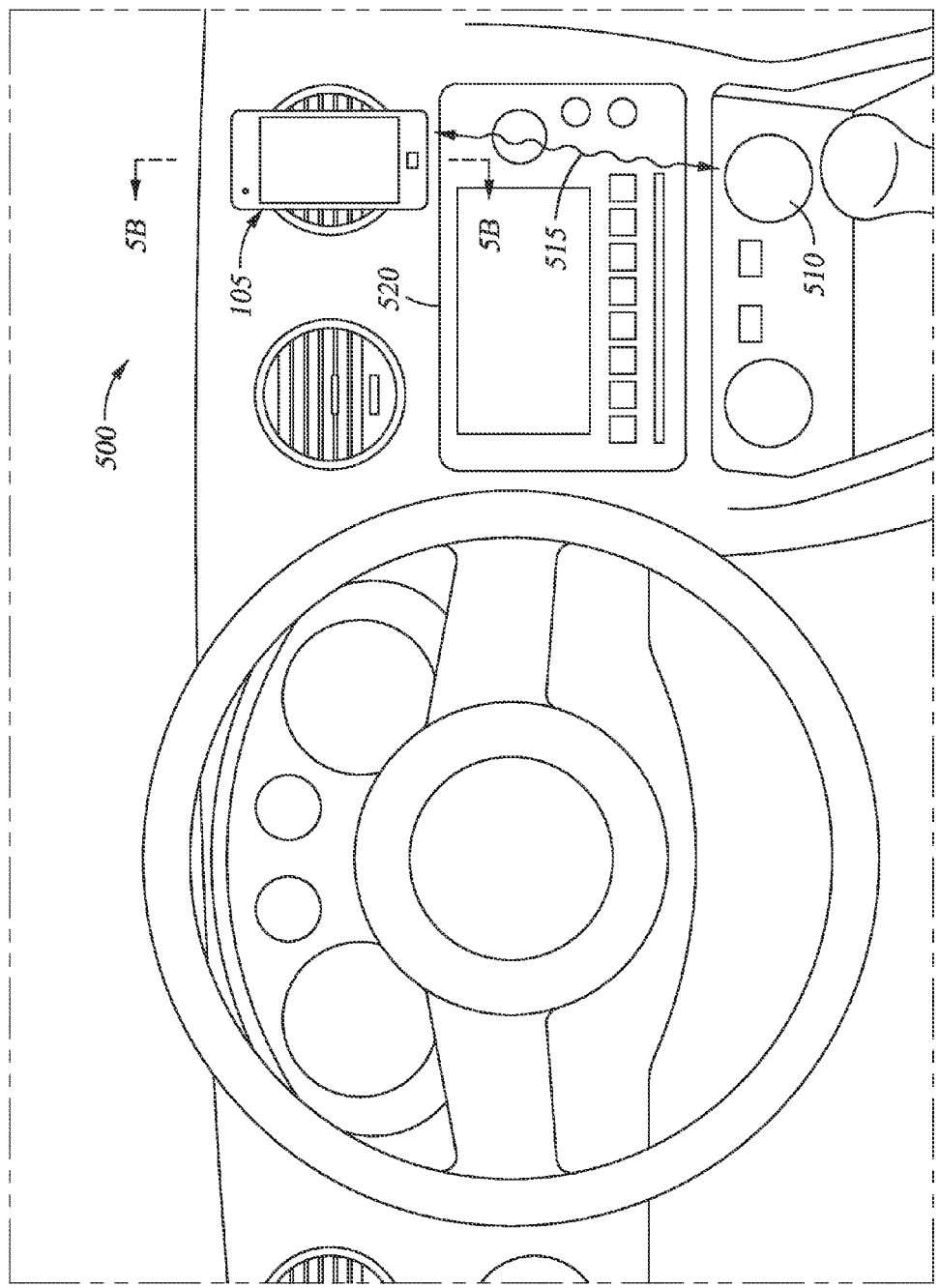
FIG. 5A illustrates an electronic device in a first orientation relative to a mounting device that is disposed in an automobile environment, according to one embodiment of the present disclosure.
Figure 5B:
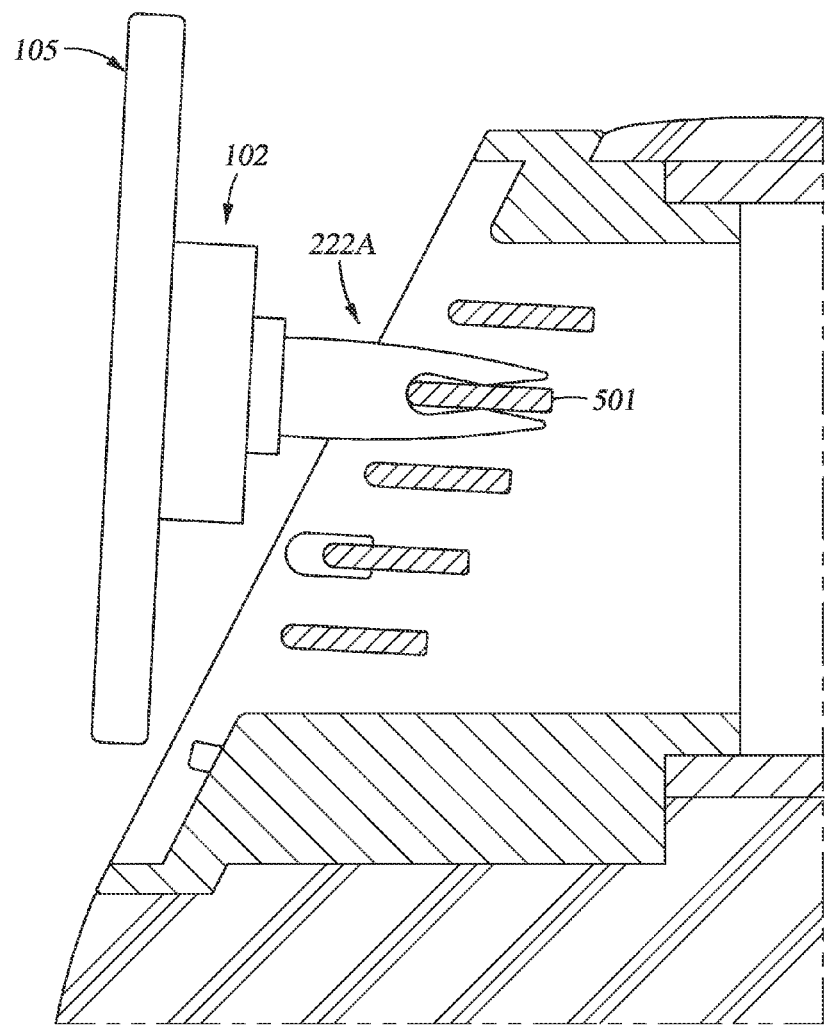
FIG. 5B is a cross-sectional view of the electronic device using the section lines 5B-5B illustrated in FIG. 5A, according to one embodiment of the present disclosure.
Figure 5C:
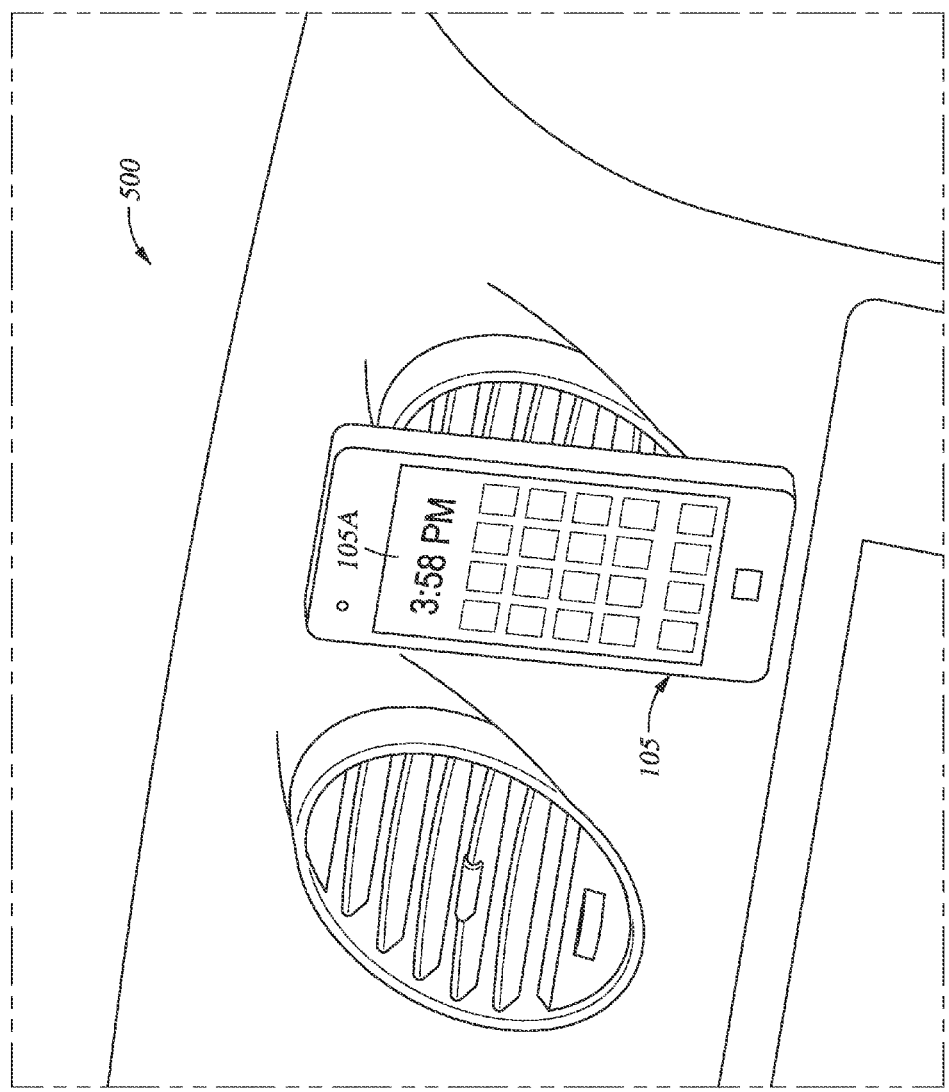
FIG. 5C illustrates an electronic device in a first orientation relative to the mounting device as also illustrated in FIGS. 5A-5B, according to one embodiment of the present disclosure.
Figure 5D:
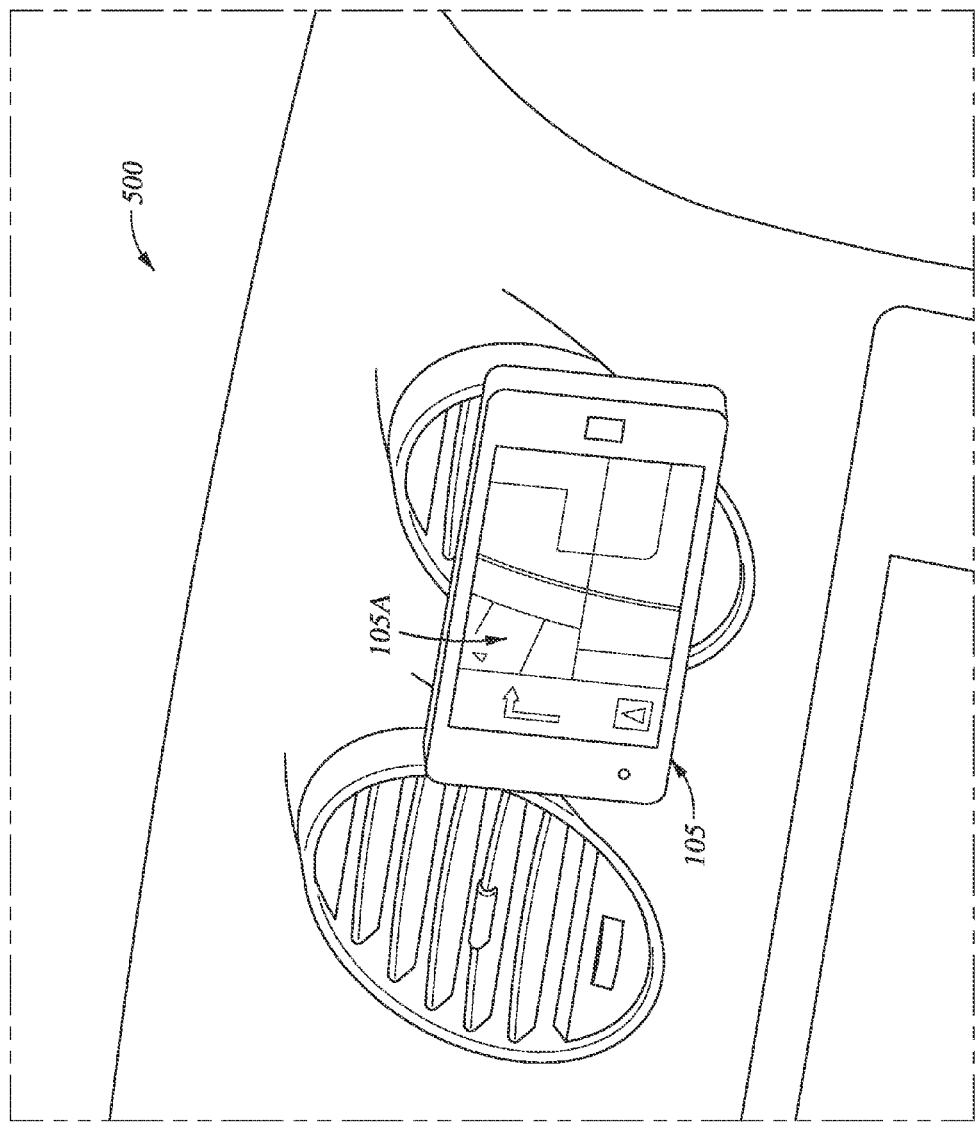
FIG. 5D illustrates an electronic device in a second orientation relative to the mounting device illustrated in FIGS. 5A-5B, according to one embodiment of the present disclosure.

In one example, as illustrated in FIGS. 5A-5C, when a primary portable device 105 is disposed in a first orientation, while in an automobile environment 500, a desired automobile related primary control function is performed by the software applications running on the primary portable device 105. When the primary portable device 105 is disposed in a second orientation (FIG. 5D), a different type of primary control function is performed by the software applications running on the primary portable device 105. In some embodiments, the mounting assembly 102 is configured to communicate with a Bluetooth system in the automobile or other similar automobile mounted device via a communication link 515. In one example, the mounting device is configured to communicate with an audio device 520 that is disposed in the automobile environment 500. By use of the communication link 515, the mounting assembly 102 is then able to exchange information with electronics in the automobile and the primary portable device 105 so that desired primary control functions can be selected and performed by the primary portable device 105. FIG. 5B is a side cross-sectional view of a primary portable device 105 that is disposed on and supported by a mounting assembly 102, which is coupled to a louver 501 of an air vent of an automobile. FIG. 5C is an isometric view of a primary portable device 105 that is configured to perform a first primary control function while it is disposed in a first orientation in the automobile environment 500. In one example, the primary portable device 105 is configured to perform audio playback, hands-free texting or phone type software applications while it is disposed in the first orientation. FIG. 5D is an isometric view of a primary portable device 105 that is performing a second primary control function while it is disposed in a second orientation in the automobile environment 500. In one example, the primary portable device 105 is configured to perform navigation type software applications while it is disposed in the second orientation using software running on the primary portable device 105.

Figure 6C:
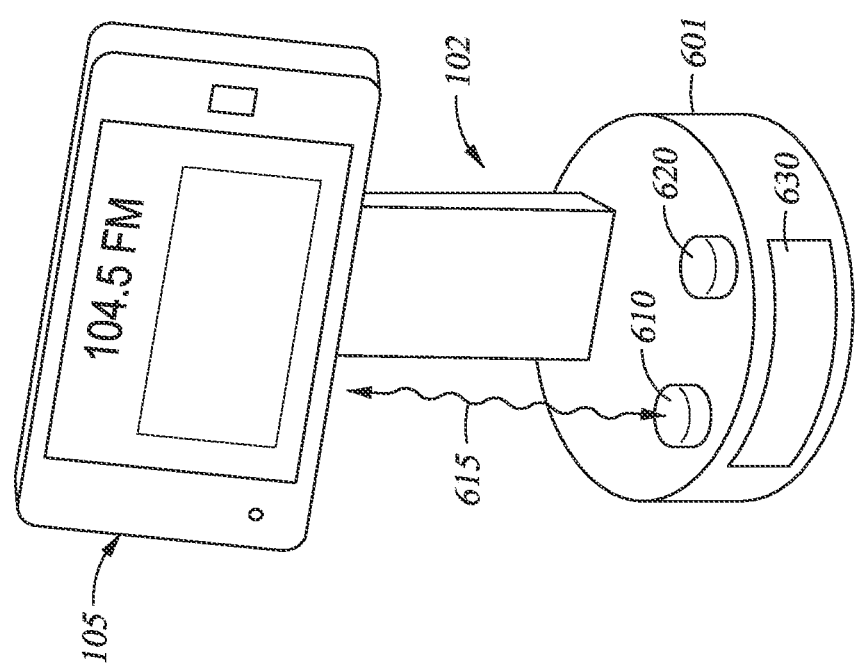
FIG. 6C illustrates an electronic device that is alternately positioned on a mounting device versus the configuration illustrated in FIG. 6A, according to one embodiment of the present disclosure.

In some embodiments, as illustrated in FIG. 6A, a primary portable device 105 may be caused to interact with a mounting assembly 102 that forms part of docking station 600. In some cases, the docking station 600 may include elements that form part of a clock radio, a wireless charging station, a wireless speaker system and/or any other useful consumer electronic elements. FIG. 6B is an isometric view of the docking station 600 that includes a base 601, speaker 610, wireless charging system 620, an optional auxiliary LCD display 630 and other electrical components (not shown) that allow the docking station 600 to perform some useful consumer electronics type function. The base 601 and mounting assembly 102 may be integrated together so that the surface 602 of the mounting assembly 102 and base 601 can support a primary portable device 105, as shown in FIGS. 6A and 6C. The docking station 600 may further include a processor (not shown) coupled to input/output (I/O) devices (not shown), a power source (not shown) and a memory unit (not shown). Memory unit in the docking station 600 may include one or more software applications and stored media data. Processor may be a hardware unit or combination of hardware units capable of executing software applications and processing data that at least helps enable the mounting assembly 102 to cause the primary portable device 105 to perform its desired primary control function. The docking station 600 may also be battery powered or powered by a standard wall plug.

The docking station 600 may include a speaker 610, which may be similar to the media output device 180 discussed above. The speaker 610 may be adapted to pair and communicate with the primary portable device 105 via a communication link 615, which may be similar to the communication link 170 discussed above. In one example, as shown in FIG. 6C, while the primary portable device 105 is disposed in a first orientation on the mounting assembly 102 it is configured to perform audio playback using a formed wireless connection to the speaker 610 disposed in the base 601. However, when the primary portable device 105 is disposed in a second orientation relative to the docking station 600, as shown in FIG. 6A, the primary portable device 105 is configured to perform a second primary control function, such as use an internet communication enabling or business software application enabling programs.

Figure 6D:
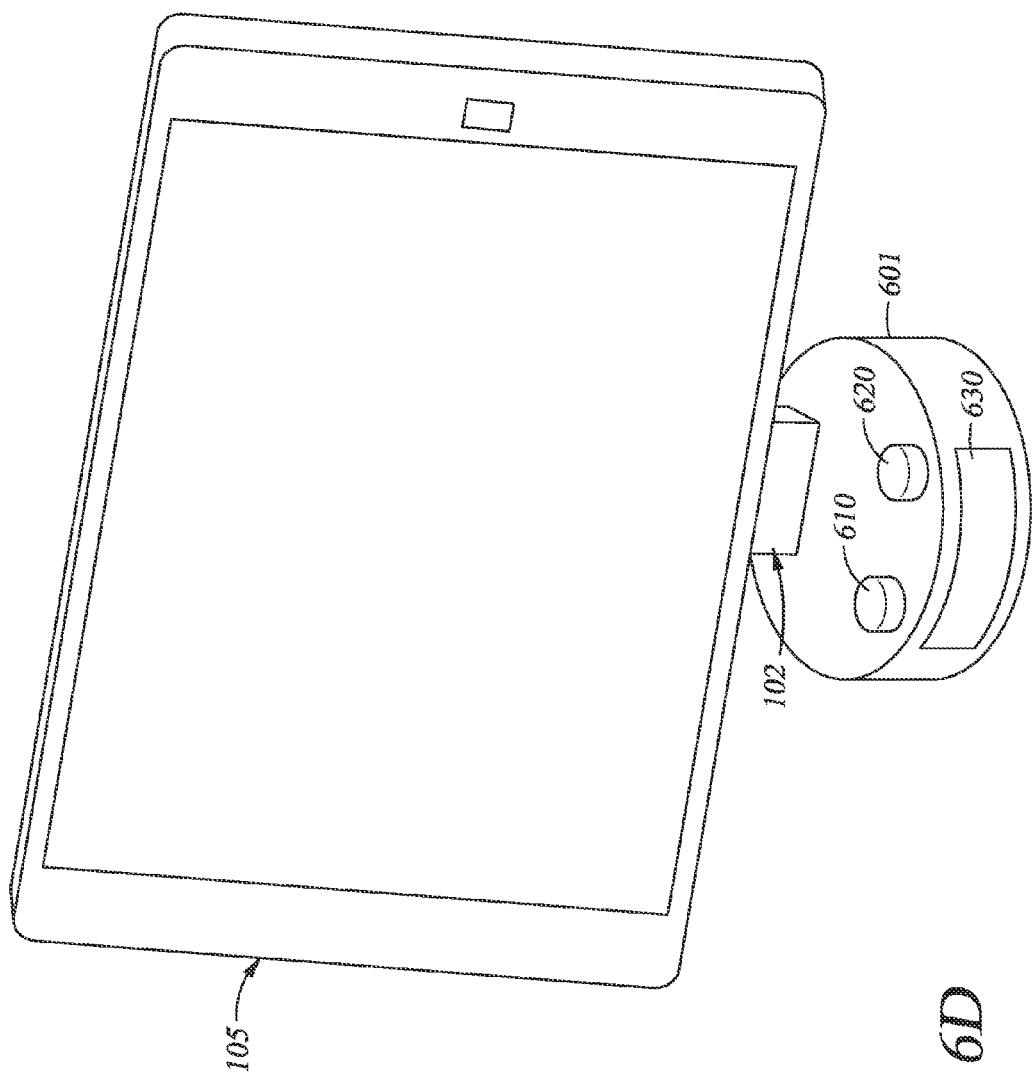
FIG. 6D illustrates an electronic device positioned on a mounting device of a docking station, according to one embodiment of the present disclosure.

In another example, as illustrated in FIG. 6D, the primary portable device 105 may be a tablet type device that is positioned on the docking station 600. In this configuration the primary portable device 105 may be easily configured and adapted to perform certain multimedia, video playback, e-book, and/or internet surfing type applications based the interaction of and information transferred between the primary portable device 105 with the mounting assembly 102.

In some embodiments, the docking station 600 may include a wireless charging device 620 and the mounting assembly 102 includes components that allow the battery elements in the mounting assembly 102 to be charged by use of the wireless charging device 620. In one embodiment, the wireless charging element 620 is configured to charge the batteries in the mounting assembly 102 and/or the batteries primary portable device 105. In some configurations, the interaction (e.g., energy transfer) of the wireless charging element 620 with either the mounting assembly 102 or the primary portable device 105 causes the mounting assembly 102 to perform one or more of the steps in the process sequence 300, such as steps 304 or 310 and then any desired subsequent steps as discussed above. In one example, the interaction of the wireless charging element 620 with the mounting assembly 102 causes the mounting assembly 102 to generate one or more communication signals based on the sensed interaction of the wireless charging element 620 with the mounting assembly 102. In the case where the wireless charging element 620 is used to charge the primary portable device 105, a wireless triggering signal generated by the software and hardware running on the primary portable device 105 may be delivered to the mounting assembly 102, due to the initiation of the process of charging the batteries in the primary portable device 105 by the wireless charging element 620. The triggering signal may replace the processes performed during step 302 and/or be a precursor to the start of the process sequence 300, which are discussed above.

Figure 7:
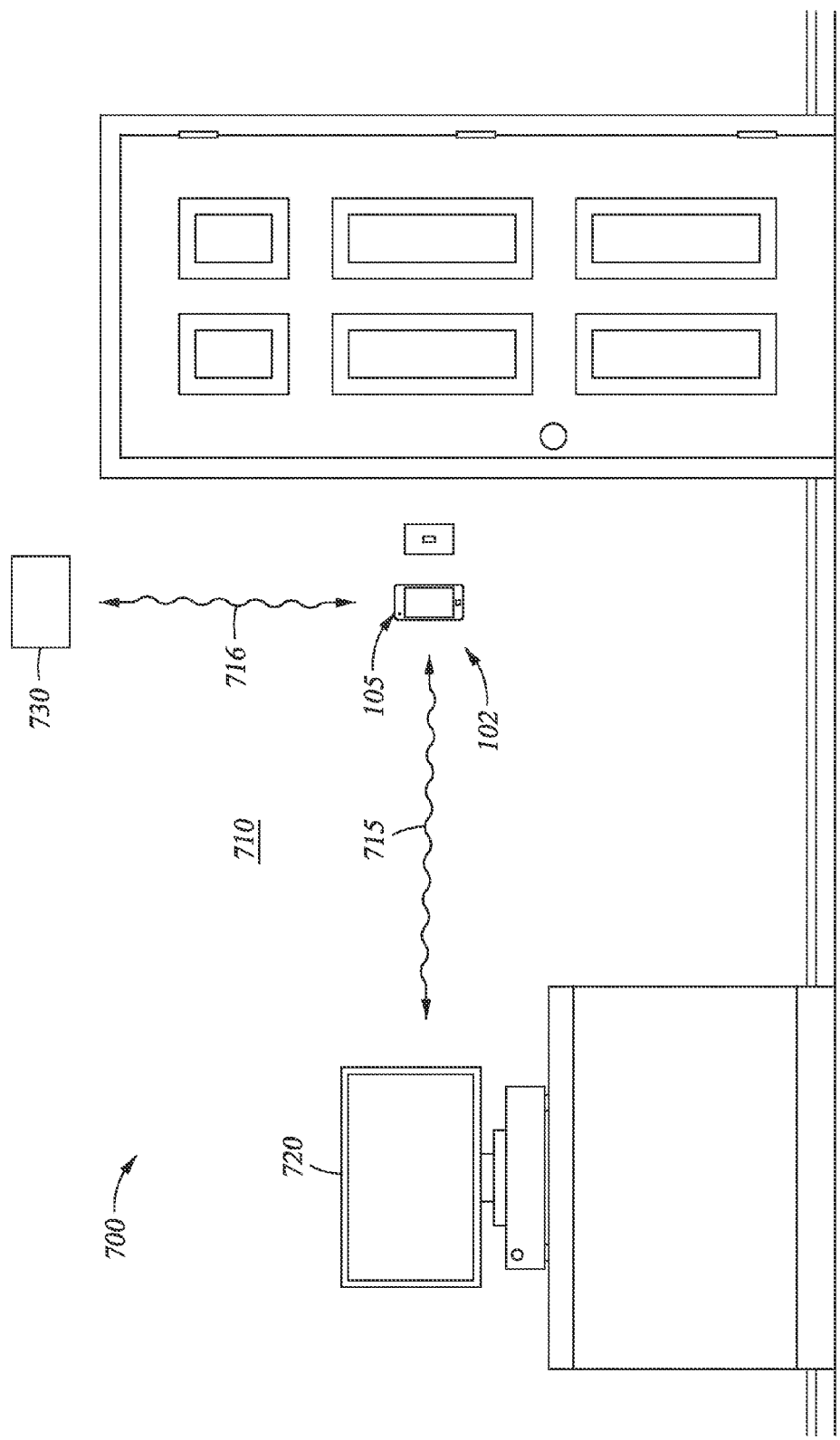
FIG. 7 illustrates an electronic device positioned on a mounting device that is positioned in a residential or business environment, according to one embodiment of the present disclosure.

In some embodiments, the primary portable device 105 may be adapted to perform home automation or other useful residential or business applications based on the interaction of the primary portable device 105 with a desirably configured mounting assembly 102. FIG. 7 illustrates a primary portable device 105 that is positioned on a mounting assembly 102 that is disposed on a wall 710 of house 700. In this example, the primary portable device 105 is reconfigured, by the interaction of the primary portable device 105 with the mounting assembly 102, to perform a desired primary control function. In one example, the mounting assembly 102 is configured to provide home automation type primary control function information to the primary portable device 105. In this example, the primary portable device 105 may be adapted to interact with various electronic components, such as a video providing component 720 (e.g., cable box, television) or alarm system 730, based on user input and software launched by the interaction of the primary portable device 105 with the mounting assembly 102. The interaction of the primary portable device 105 with the various components may be performed by use of one or more wireless communication links 715, 716.

One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of controlling an electronic device, comprising:
receiving, at a first electronic device, a first input from a user at a first time, wherein the user provides the first input directly to the first electronic device, and the first input includes a physical input or an audible input;
receiving, at the first electronic device, information from a second electronic device, wherein the received information is received at a second time; and
controlling a delivery of information to the user from the first electronic device, wherein controlling the delivery of information comprises:
providing the information received from the second electronic device to the user based on determining a magnitude of a difference between the second time and the first time is less than or equal to an input time window value that is stored in a memory location of the first electronic device; and
storing the information received from the second electronic device in a memory location based on determining the magnitude of the difference between the second time and the first time is greater than the input time window value.

2. The method of claim 1, wherein receiving the first input from the user at the first time further comprises:
receiving, at the first electronic device, additional information from the second electronic device; and
providing the additional information to the user, wherein the additional information is received by the first electronic device before the first input is received from the user.

3. The method of claim 1, further comprising:
receiving, at a first electronic device, a second input from the user at a third time, wherein a difference between the third time and the first time is greater than the difference between the second time and the first time; and
providing the information stored in memory to the user due to the received second input.

4. The method of claim 1, further comprising:
initiating a hold timer based on the determination that the magnitude of the difference between the second time and the first time is greater than the input time window value; and
delivering the information received from the second electronic device to the user after it is determined that the hold timer has reached a desired hold time.

5. The method of claim 1, further comprising:
receiving, at the first electronic device, a second input from the user at a third time;
receiving, at the first electronic device, additional information from the second electronic device, wherein the received additional information is received at a fourth time; and
controlling a delivery of the additional information to the user from the first electronic device, wherein controlling the delivery of the additional information comprises:
providing the additional information to the user based on determining a magnitude of a difference between the fourth time and the third time is less than or equal to the input time window value; and
storing the additional information in a memory location based on determining the magnitude of the difference between the fourth time and the third time is greater than the input time window value.

6. The method of claim 5, wherein a difference between the third time and the first time is greater than the difference between the second time and the first time.

7. The method of claim 1, further comprising:
receiving, at the first electronic device, a second input from the user at a third time;
receiving, at the first electronic device, additional information from the second electronic device, wherein the received additional information is received at a fourth time; and
providing the additional information to the user based on determining a difference between the third time and the first time is less than the difference between the second time and the first time, and a difference between the third time and the fourth time is less than or equal to the input time window value.

8. The method of claim 1, further comprising:
receiving, at the first electronic device, a second input from the user at a third time, wherein a difference between the third time and the first time is greater than the difference between the second time and the first time; and
delivering the information received from the second electronic device to the user based on the received second input.

9. The method of claim 1, further comprising:
initiating a first pairing process between the first electronic device and a third electronic device;
receiving a first signal from a sensor disposed within the first electronic device, wherein the first signal comprises information relating to an interaction event;
receiving a second signal from the third electronic device;
comparing the information in the first signal and the second signal; and
initiating a second pairing process between the first electronic device and the second electronic device based on the comparison of the first signal and the second signal.

10. A method of controlling an electronic device, comprising:
receiving, at a first electronic device, a first input from a user at a first time, wherein the user provides the first input directly to the first electronic device, and the first input includes a physical input or an audible input;
initiating a messaging timer due to the receipt of the first input;
receiving, at the first electronic device, information from a second electronic device, wherein the received information is received after the messaging timer has exceeded an input time window;
initiating a hold timer based on the receipt of the information from the second electronic device after the messaging timer has exceeded the input time window; and delivering the information received from the second electronic device to the user after it is determined that the hold timer has reached a desired hold time.

11. The method of claim 10, further comprising:
storing the received information in a memory location before delivering the information received from the second electronic device to the user.

12. The method of claim 10, wherein receiving the first input from the user at the first time further comprises:
receiving, at the first electronic device, additional information from the second electronic device; and
providing the additional information to the user, wherein the additional information is received by the first electronic device before the first input is received from the user.

13. The method of claim 10, further comprising:
analyzing the information received from the second electronic device to determine if the information received from the second electronic device comprises additional data; and
launching a software program stored in a memory of the first electronic device, wherein the software program is selected based on the presence of the additional data found during the analysis of the information received from the second electronic device.

14. The method of claim 10, further comprising:
initiating a first pairing process between the first electronic device and a third electronic device;
receiving a first signal from a sensor disposed within the first electronic device, wherein the first signal comprises information relating to an interaction event;
receiving a second signal from the third electronic device;
comparing the information in the first signal and the second signal; and
initiating a second pairing process between the first electronic device and the second electronic device based on the comparison of the first signal and the second signal.

15. An electronic device, comprising:
a processor; and
a non-transitory memory having stored therein a number of instructions which, when executed by the processor, causes the electronic device to perform operations comprising:
receiving a first input from a user at a first time, wherein the user provides the first input directly to the electronic device, and the first input includes a physical input or an audible input;
receiving information from a second electronic device, wherein the received information is received at a second time; and
controlling a delivery of information to the user from the electronic device, wherein controlling the delivery of information comprises:
providing the information received from the second electronic device to the user based on determining a magnitude of a difference between the second time and the first time is less than or equal to an input time window value that is stored in the non-transitory memory of the electronic device; and
storing the information received from the second electronic device in the non-transitory memory based on determining the magnitude of the difference between the second time and the first time is greater than the input time window value.

16. The electronic device of claim 15, wherein the non-transitory memory also having stored therein a number of instructions which, when executed by the processor, also cause the electronic device to perform operations comprising:
receiving, at the electronic device, additional information from the second electronic device; and
providing the additional information to the user, wherein the additional information is received by the electronic device before the first input is received from the user.

17. The electronic device of claim 15, wherein the non-transitory memory also having stored therein a number of instructions which, when executed by the processor, also cause the electronic device to perform operations comprising:
receiving, at the electronic device, a second input from the user at a third time, wherein a difference between the third time and the first time is greater than the difference between the second time and the first time; and
providing the information stored in the non-transitory memory to the user due to the received second input.

18. The electronic device of claim 15, wherein the non-transitory memory also having stored therein a number of instructions which, when executed by the processor, also cause the electronic device to perform operations comprising:
initiating a hold timer based on the determination that the magnitude of the difference between the second time and the first time is greater than the input time window value; and
delivering the information received from the second electronic device to the user after it is determined that the hold timer has reached a desired hold time.

19. The electronic device of claim 15, wherein the non-transitory memory also having stored therein a number of instructions which, when executed by the processor, causes the electronic device to perform operations comprising:
initiating a first pairing process between the electronic device and the second electronic device;
receiving a first signal from a sensor, wherein the first signal comprises information relating to an interaction event;
receiving a second signal from a first portable device;
comparing the information in the first signal and the second signal; and
initiating a second pairing process between the electronic device and the second electronic device based on the comparison of the first signal and the second signal.

* * * * *